United States Patent [19]

Inabata et al.

[11] Patent Number: 5,084,723
[45] Date of Patent: Jan. 28, 1992

[54] FOCUS DETECTING DEVICE

[75] Inventors: Tatsuo Inabata, Kunitachi; Yasunobu Otsuka, Hachiouji, both of Japan

[73] Assignee: Olympus Optical Co., Ltd., Tokyo, Japan

[21] Appl. No.: 558,321

[22] Filed: Jul. 26, 1990

[30] Foreign Application Priority Data

Jul. 28, 1989 [JP] Japan .................. 1-195752

[51] Int. Cl.$^5$ .............................................. G03B 13/36
[52] U.S. Cl. .................................................. 354/407
[58] Field of Search .................. 354/406, 407, 408

[56] References Cited

U.S. PATENT DOCUMENTS

| | | | |
|---|---|---|---|
| 4,220,406 | 9/1980 | Schaefer | 354/407 |
| 4,408,853 | 10/1983 | Tokutomi et al. | 354/407 |
| 4,560,863 | 12/1985 | Matsumura et al. | 354/407 |
| 4,698,492 | 10/1987 | Ohtaka et al. | 354/407 |
| 4,699,493 | 10/1987 | Koyama et al. | 354/406 |
| 4,745,426 | 5/1988 | Suda et al. | 354/407 |
| 4,825,239 | 4/1989 | Suda et al. | 354/407 |
| 4,841,326 | 6/1989 | Koyama et al. | 354/406 |

FOREIGN PATENT DOCUMENTS

| | | |
|---|---|---|
| 59-40610 | 3/1984 | Japan . |
| 62-33564 | 7/1987 | Japan . |

*Primary Examiner*—Russell E. Adams
*Attorney, Agent, or Firm*—Cushman, Darby & Cushman

[57] ABSTRACT

The focus detecting device comprises a primary imaging optical system, a focus detecting optical system, an aperture stop, deflection prisms and a photoelectric transducing member which are arranged on an optical axis in the order from the object side. This focus detecting device is capable of having a wide focus detecting field angle, a high imaging magnification and a high focus detecting accuracy in addition to a short total length and favorable functions to correct aberrations.

11 Claims, 23 Drawing Sheets

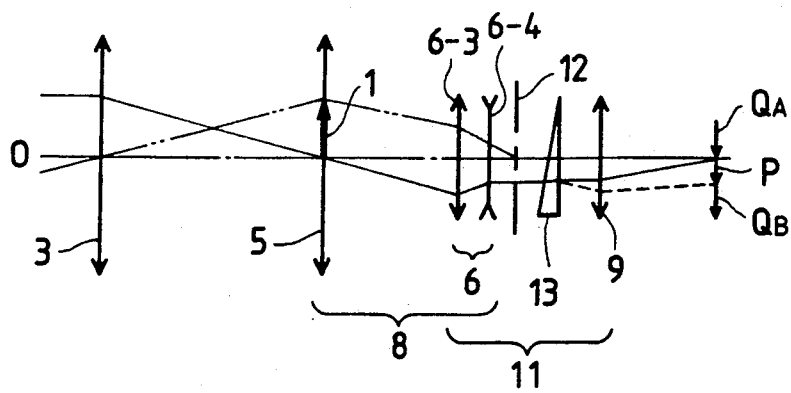
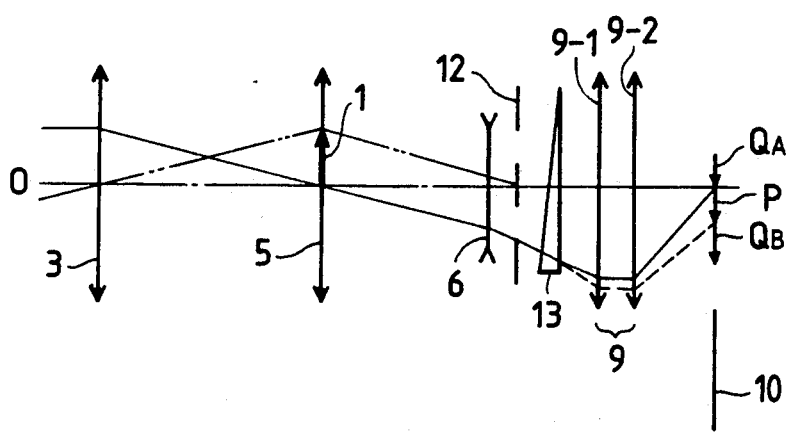
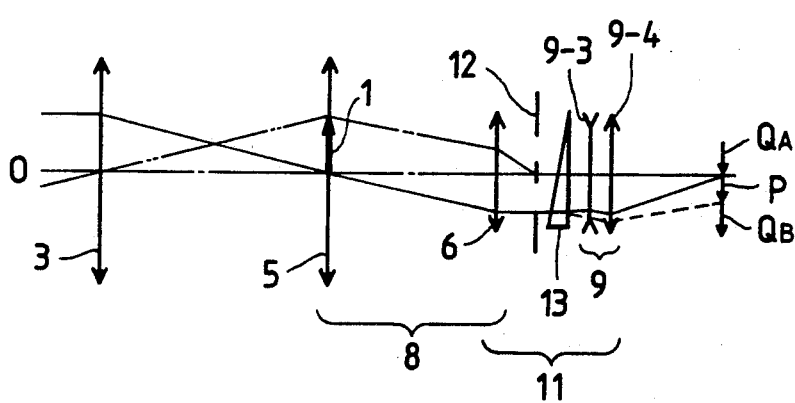
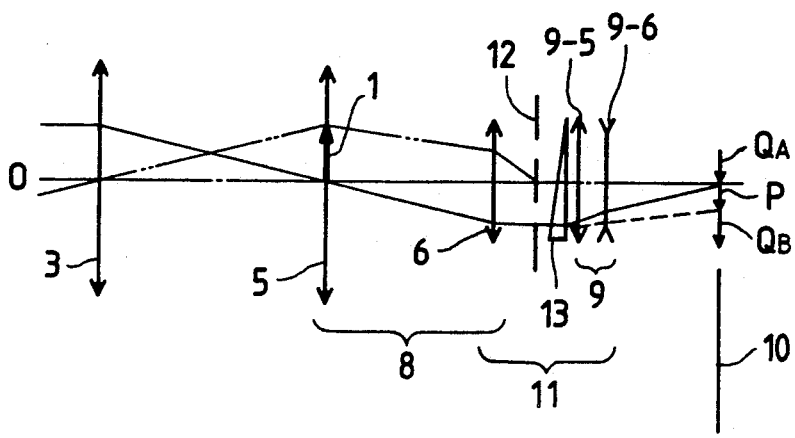

FOCUS DETECTING DEVICE

BACKGROUND OF THE INVENTION a) Field of the Invention

The present invention relates to a focus detecting device to be used with cameras, with silver halide, video camera, still video cameras and so on.

b) Description of the Prior Art

A large number of inventions have hitherto been made to provide devices for detecting focused conditions of still cameras and so on. Out of the method adopted for these devices, the typical one is to split, with an optical member, an imaging light bundle coming from an object to be photographed into two bundles so as to form two images with parallax on an image surface, and detect an interval between these two images with a photoelectric transducing member for focusing. This method is disclosed, for example, by Japanese Patent Preliminary Publication No. Sho 59-40610. FIG. 1 is a diagram illustrating the principle of the focus detecting device disclosed by this publication, and FIG. 2 is a diagram illustrating the main section of FIG. 1 on an enlarged scale.

In these drawings, arranged on an optical axis O is a primary imaging optical system 3, for example a photographic lens system, for forming a primary image 1 with the light bundle coming from an object to be photographed. In the vicinity of the location at which the image is formed by the primary imaging optical system in the focused condition thereof, i.e., a primary image surface 2 which is positionally equivalent to the light receiving surface of a photographic film or an image sensor, a pupil transmitting optical system 8 is arranged for forming an image of an exit pupil 4 of the primary imaging optical system 3, and an aperture stop 12 having a pair of apertures l and m at locations offset from the optical axis is arranged in the vicinity of a surface 7 on which an image of the exit pupil is to be formed by the pupil transmitting optical system 8. The deflection prisms 13 (only one is shown) are arranged at locations corresponding to the apertures l and m respectively of the aperture stop 12. When the deflection prism 13 is not arranged, the focus detecting optical system functions as an ordinary optical system wherein the imaging light bundles having passed through the upper aperture m and the lower aperture l of the aperture stop 12 form a secondary image at a point P on the optical axis O as indicated by the solid lines in FIG. 2. When the deflecting prism 13 is arranged, in contrast, a virtual image is formed in a condition where the optical axis O is rotated by an angle $\theta$ around a point Z located at the intersection between the prism insertion surface and the optical axis O. When the deflecting prism 13 is not arranged, the secondary image P is formed taking the primary image 1 as an object point. When the flection prism 13 is arranged, in contrast, the optical function of the focus detecting optical system is shifted by the angle $\theta$ and a secondary image Q' is formed at a location offset from the optical axis O taking a virtual image Q of the primary image 1 as an object point. When an additional deflection prism corresponding to the upper aperture m is arranged in the direction reverse to the prism 13, a virtual image is formed on the optical axis rotated by an angle of $-\theta$ and a virtual image of the primary image 1 formed on the optical axis is also formed, whereby two secondary images are formed with parallax. When the position of the primary image 1 is displaced back and forth on the optical axis, the virtual image Q is also displaced on the inclined optical axis. Since the interval between the two virtual images is varied along with the displacement of the virtual image Q, the interval between the secondary images formed with the imaging light bundles having passed through the apertures, i.e., the phases thereof are also varied. Accordingly, it is possible to convert the distance of the displacement of the primary image surface 2 on the optical axis caused by variation of focused position into a shift distance of the secondary image surface 10 in the direction perpendicular to the optical axis O and detect a shift distance for focusing with a photoelectric transducer or the similar element.

Further, Japanese Patent Publication No. Sho 62-33564 discloses a focus detecting device shown in FIG. 3, wherein a field lens 15 is arranged in the vicinity of the primary image surface 2, a positive imaging lens 17 is arranged after the field lens 15 at a location where the front focal point of the positive imaging lens 17 is coincident with the primary image surface 2, and two relay lenses $16_A$ and $16_B$ are arranged after the positive imaging lens 17 at locations symmetrical with each other with regard to the optical axis O so that two secondary images $19_A$ and $19_B$ are formed with the field lens 15, the positive imaging lens 17, and two relay lenses $16_A$ and $16_B$. The exit pupil surface 4 of a primary imaging optical system (not shown) and the pupil surfaces of the relay lenses $16_A$ and $16_B$ are located at positions conjugate with each other with regard to the field lens 15 and the positive imaging lens 17. In the composition of the focus detecting optical system described above, the light bundle transmitted from the primary image surface 2 and having passed through the positive imaging lens 17 is a parallel light bundle. Let us consider an optional point FQ which is located within a detectable field angle on the primary image surface 2, and two light pencils transmitted from said point FQ. After having passed through the positive imaging lens 17, these two light pencils are indicident on the relay lenses $16_A$ and $16_B$ at angles $\omega_1$ and $\omega_2$ which are equal to each other with regard to the optical axes $O_A$ and $O_B$ of the relay lenses $16_A$ and $16_B$ respectively. Further, since the light pencils are parallel with each other in the section between the positive imaging lens 17 and the relay lenses $16_A$ and $16_B$, imaginary apertures $18_A$ and $18_B$ which are set by the relay lenses $16_A$ and $16_B$ respectively on the surface of the pupil of the positive imaging lens 17 have areas equal to each other. Accordingly, uniformity of illuminance is improved for the image points $19_A$ and $19_B$ on the image surface (the secondary image surface 10) of the relay lenses $16_A$ and $16_B$.

Along with the recent progress made in the autofocus mechanisms, there have been developed the photographic elements such as image sensors and silver halide film which have high sensitivities to provide high sharpness. Under this circumstance, it is demanded to develop a focus detecting device which can detect slight deviation between images accurately in the autofocus mechanisms. In order to meet this demand, it is necessary to enhance detecting capability of the photoelectric detecting members such as the photodiode array, but such an improvement is possible only within a certain limited range. In order to obtain higher detecting accuracy, it is necessary to detect a slightly defocused condition as a long displacement distance of images on the light receiving surface of the photoelectric detecting member currently available. For this purpose, it is sufficient to enhance imaging magnification of an optical system for forming a secondary image so that a slight deviation of focused point is presented accurately as a long displacement distance. Further, since an optical system for reimaging the primary image should desirably have a wide field angle, the secondary imaging optical system should ideally have a composition which can provide a wide field angle and a high magnification. In the optical composition of the focus detecting device disclosed by Japanese Patent Preliminary Publication No. Sho 59-40610, however, the optical system for forming the secondary image consists only of a single lens element and the location of the primary image surface 2 is nearly fixed for each photographing optical system, whereby the distance a as measured from the front principal point HF of a secondary imaging optical system 11 to the primary image surface 2 is inevitably determined and has no selectional flexibility. Accordingly, imaging magnification is dependent mainly on the focal length the focus detecting optical system 11, and the lens element composing this optical system must bear all the burden of the power thereof and have a very small radius of curvature. Since the lens element can have an effective diameter at maximum twice as long as the radius of curvature thereof, it is impossible to select so wide a focus detecting field angle for the secondary imaging optical system 11. Since the secondary imaging optical system 11 is composed of a single lens element as described above, it is impossible to select a favorable imaging magnification for the focus detecting optical system. Further, the secondary imaging optical system 11 which is composed of a single lens element makes it difficult to correct aberrations favorably on an image. The aberrations cannot be corrected sufficiently especially when it is desired to obtain a high imaging magnification regardless of the small radii of curvature on both the sides of the lens element composing the secondary imaging optical system 11. Accordingly, imaging performance is degraded, thereby lowering focus detecting accuracy. Furthermore, the composition wherein the secondary imaging optical system 11 is composed of a single lens element restricts design flexibility and does not permit designing the focus detecting device compact by shortening total length of the optical system thereof.

Moreover, Japanese Patent Publication No. Sho 62-33564 discloses a focus detecting device wherein the secondary imaging optical system 11 consists of a plurality of lens elements. However, since this optical system is so composed as to improve uniformity of illuminance on the two images formed on the secondary image surface 10, the light pencils having passed through the positive imaging lens 17 are incident parallely with each other on the relay lenses $16_A$ and $16_B$. In order to obtain a wide field angle on the side of incidence of the secondary imaging optical system 11 and a high imaging magnification on the side of emergence of the secondary imaging optical system 11 in this composition, it is required to independently obtain a wide field angle with the positive imaging lens 17 and a high imaging magnification with the relay lenses $16_A$ and $16_B$. Accordingly, the composition selected by the above-mentioned patent has no flexibility to adjust power distribution though the secondary imaging optical system 11 is composed of a plurality of lens elements. Further, the composition does not permit correcting aberrations favorably or shortening total length of the optical system since the positive imaging lens 17 and the relay lenses $16_A$ and $16_B$ must have powers predetermined for obtaining the wide field angle and the high imaging magnification respectively.

SUMMARY OF THE INVENTION

In view of the problems described above, it is a primary object of the present invention to provide a focus detecting device which permits obtaining a wide focus detecting field angle and a high imaging magnification.

It is another object of the present invention to provide a focus detecting device which is short in total length thereof, has a capability to favorably correct aberrations and permits obtaining high focus detecting accuracy.

The focus detecting device according to the present invention comprises, in the order from the object side, a primary imaging optical system for forming a primary image of an object to be photographed, a focus detecting optical system which consists at least of a first lens component, a second lens component and a third lens component all having positive refractive powers, and serves as a pupil transmitting optical system for forming an image of the exit pupil of said first imaging optical system and also as a secondary imaging optical system for forming a secondary image of the primary image, an aperture stop which is arranged on the image surface of the exit pupil and has at least two apertures at positions offset from the optical axis, two deflection prisms for forming two images which are arranged in the vicinity of the aperture stop at locations corresponding to said apertures respectively, and a photoelectric transducing member arranged on the secondary image surface for detecting variation of relative positions between the two images formed by the focus detecting optical system and the deflection prisms, all the members mentioned above being arranged on an optical axis.

Since the power and aberration correcting function can be shared between the first positive lens component and the second positive lens component in the pupil transmitting optical system, the focus detecting device according to the present invention can have a wide field angle, while maintaining a magnification thereof at a level higher than those of the conventional focus detecting devices, by designing the first lens component so as to have a weakended power and a larger radius of curvature for obtaining a wide field angle, and making up for the weaked power by the second lens component. Further, since the second and third lens components are used as the secondary imaging optical system and the deflection prism is used as the means for separating the secondary image into two images, the two images $Q_A$ and $Q_B$ are formed by the same second and third lens components in the focus detecting device according to the present invention. Accordingly, the focus detecting device according to the present invention is free from the difference in resolution between the two images produced by errors in manufacturing and assembling stages of the lens components. Further, since the second lens component and the third lens component are arranged on optical axis common thereto, no restriction is imposed on powers of these lens components or power distribution is freely selectable between these lens components. Accordingly, power distribution can be selected so as to correct aberrations favorably, obtain a wide field angle with the second lens component and obtain a high magnification with the third lens component, whereby the focus detecting device according to the present invention can indicate slight defocused condition of the primary image as a relative positional variation between $Q_A$ and $Q_B$ on a large scale, and have high imaging performance as well as high focus detecting accuracy.

The focus detecting device according to the present invention can exibit the above-mentioned effects simultaneously with a single optical system owing to the fact that the second lens component is served as the pupil transmitting optical system and also as the secondary imaging optical system.

These and other objects as well as the features and the advantages of the present invention will become apparent from the following detailed description of the preferred embodiments when taken in conjuction with the accompanying drawings.

BRIEF DESCRIPTION OF THE DRAWINGS

FIG. 5 through FIG. 13 are paraxial lens arrangement diagrams illustrating compositions of Embodiments 1 through 9 of the focus detecting device according to the present invention:

DETAILED DESCRIPTION OF THE PREFERRED EMBODIMENTS

All the embodiments to be described below are focus detecting optical systems composed of members which are arranged on an optical axis common thereto, and will be explained consecutively with reference to the accompanying drawings.

EMBODIMENT 1

Figure 1:
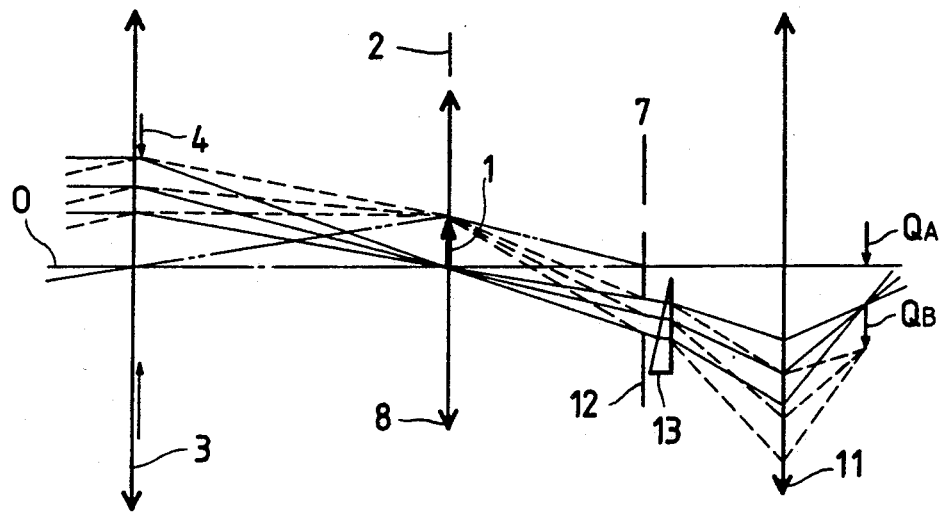
FIG. 1 through FIG. 4 are diagrams illustrating the lens arrangements in the conventional focus detecting devices.
Figure 2:
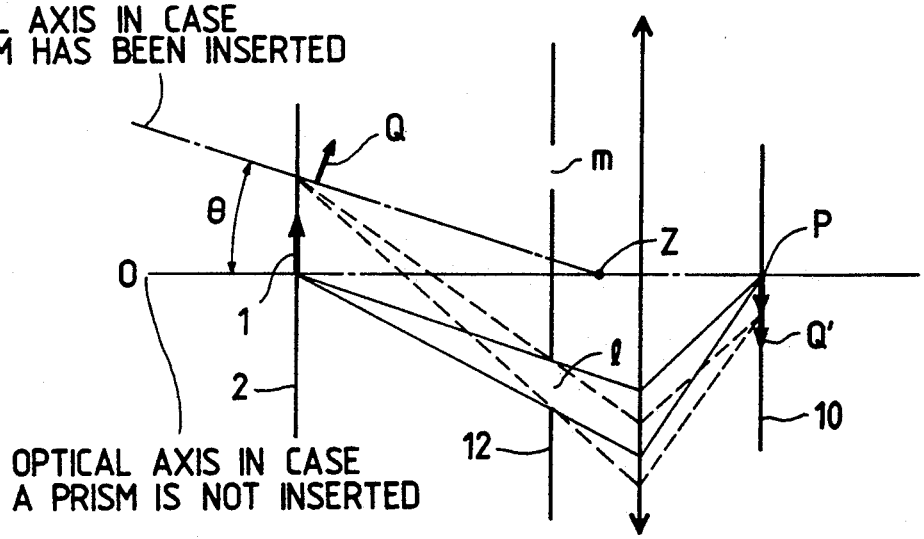
Figure 3:
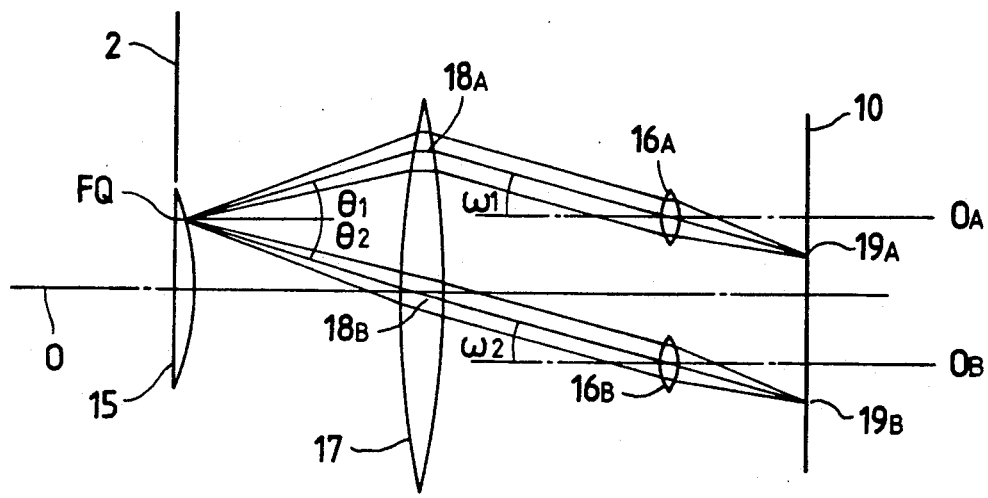
Figure 4:
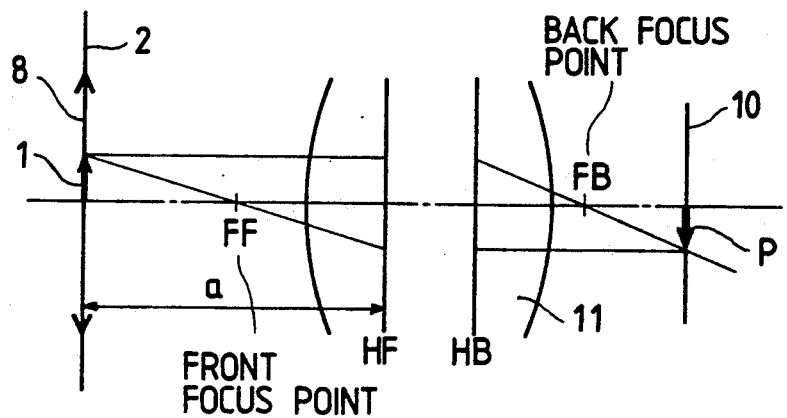
Figure 5:
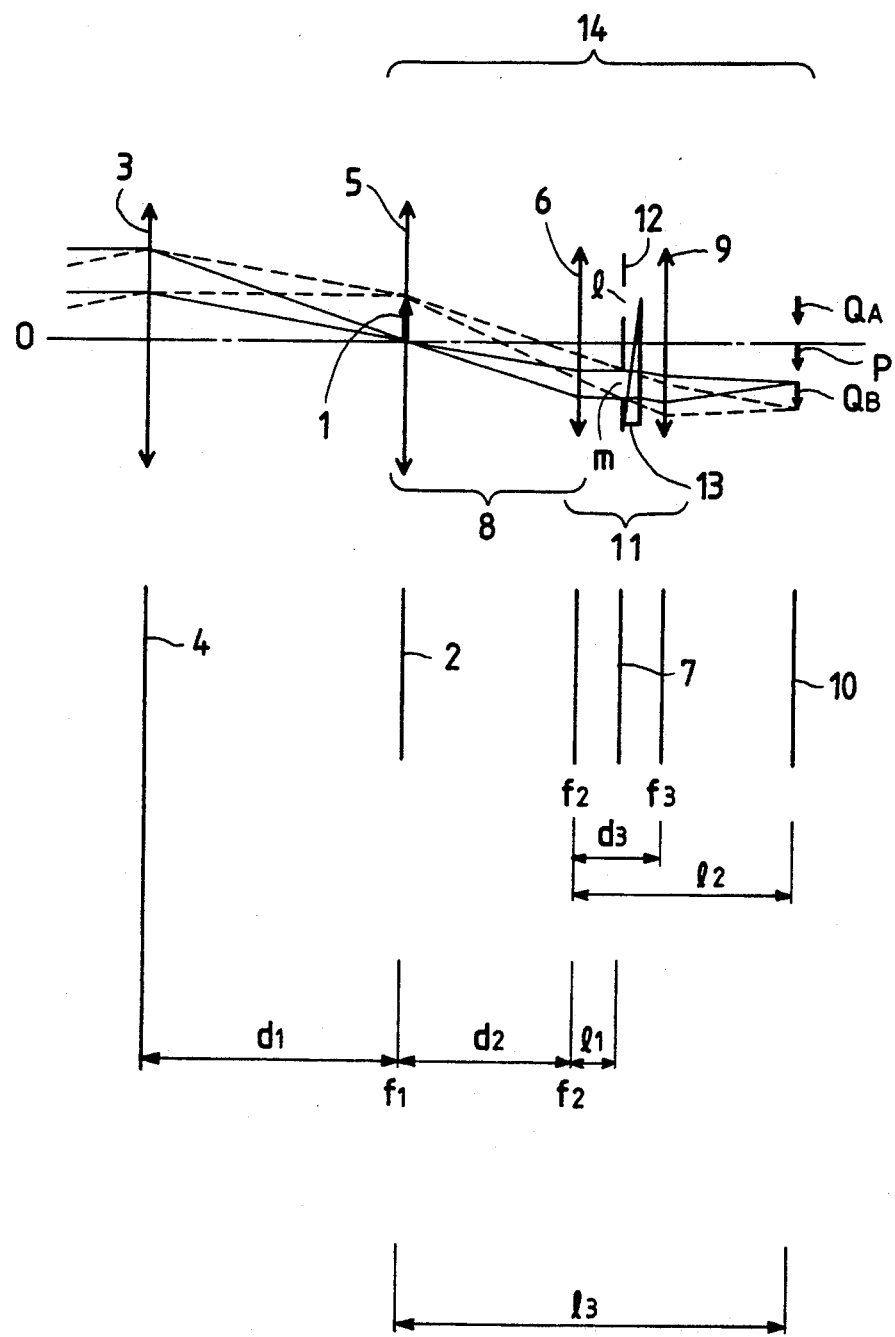

FIG. 5 shows the Embodiment 1 of the present invention. In this drawing, the reference numeral 1 represents a primary image of an object (not shown) formed on a primary image surface 2 by a positive primary imaging optical system 3. A first lens component 5 having a positive refractive power and a focal length of $f_1$ is arranged in the vicinity of the primary image surface 2 at a location at a distance of $d_1$ as measured from the primary imaging optical system 3. At a location at a distance of $d_2$ as measured from the first lens component 5, a second lens component having a positive refractive power and a focal length of $f_2$ is arranged so that the first lens component 5 and the second lens component 6 compose a pupil transmitting optical system 8 which has a focal length of $f_B$ and functions to form an image 7 of an exit pupil 4 of the primary imaging optical system 3 at a location at a distance of $l_1$ as measured from the second lens component 6 and at a magnification of $\beta_2$. Further, at a location at a distance of $d_3$ as measured from the second lens component 6, a third lens component 9 having a positive refractive power and a focal length of $f_3$ is arranged so that the second lens component 6 and the third lens component 9 compose a secondary imaging optical system 11 which has a focal length of $f_A$ and functions to form a secondary image P of the primary image 1 on the secondary image surface 10 at a location at a distance of $l_2$ as measured from the second lens component 6 and at a magnification of $\beta_1$. Furthermore, arranged on the image surface 7 of the exit pupil is an aperture stop 12 which has two apertures l and m symmertrical with regard to the optical axis. After this aperture stop 12, two deflection prisms 13 (only the one corresponding to the aperture m is shown) for forming two images to be used for detecting focused condition are arranged so that the secondary image P is formed as two images $Q_A$ and $Q_B$ which are distant from each other on the secondary image surface 10. A focus detecting optical system 14 has a total length of $l_3$ ($l_3 = d_2 + l_2$) as measured from the first lens component 5 to the secondary image surface 10.

Since the second lens component 6 is used commonly in the pupil transmitting optical system 8 and the secondary imaging optical system 11 in the composition described above, the Embodiment 1 prevents loss of light amount, comprises parts in a number increased within a minimum required range and has a compact total length. Further, since the deflection prisms 13 are arranged between the second lens component 6 and the third lens component 9, aberrations to be produced before production of parallax or on the single image can be corrected by the second lens component 6, and the aberrations to be produced after production of parallax or on the separated two images can be corrected completely independently by the third lens component 9, thereby facilitating design of the focus detecting optical system. Furthermore, since power can be shared between the second lens component 6 and the third lens component 9, it is relatively easy to obtain a wide field angle by designing the second lens component 6 so as to have a low magnification and obtain high focus detecting accuracy by designing the third lens component 9 so as to have a high magnification. Moreover, since all the optical systems used in the focus detecting optical system 14 are coaxial with one another, each lens component need not have an extremely small diameter, thereby facilitating to compose a focus detecting optical system with high precision.

In addition, it is desirable for improving the effects mentioned above to design the focus detecting optical system so as to satisfy the following conditions (1) and (2)

$$0.02 \leq |f_A/f_3| \leq 4 \qquad (1)$$

$$0.03 \leq |f_2/f_1| \leq 5 \qquad (2)$$

If the ratio occupied by the power of the third lens component 9 in the power of the secondary imaging optical system 11 is so small that the lower limit of the condition (1) is exceeded, the power of the second lens component 6 will inevitably be strengthened, thereby aggravating aberrations in both the secondary imaging optical system 11 and the pupil transmitting optical system 8. Further, the imaging magnification after production of parallax will be too high, thereby making it undesirably necessary to enlarge the diameter of the photoelectric transducing member or prolong the distance $l_3$ as measured from the primary image surface 2 to the secondary image surface 10. If the power of the third lens component 9 is so strengthened that the upper limit of the condition (1) is exceeded, in contrast, the second lens component 6 will have weaker power, thereby making it necessary to strengthen the power of the first lens component 5 for maintaining the focal length of $f_B$ of the pupil transmitting optical system 8. Accordingly, the first lens component 5 must have a radius of curvature shortened beyond the restriction imposed on the outside diameter, thereby making it impossible to reserve a sufficient focus detecting field angle. If the second lens component 6 arranged in the pupil transmitting optical system has so strong a power that the lower limit of the condition (2) is exceeded, aberrations will undesirably be aggravated in both the pupil transmitting optical system 8 and the secondary imaging optical system 11 as in the case where the lower limit of the condition (1) is exceeded. If the first lens component 5 has a power strong enough to allow the upper limit of the condition (2) to be exceeded, in constrast, the radius of curvature and diameter of the first lens component 5 will be shortened, as in the case where the upper limit of the condition (1) is exceeded, thereby undesirably making it impossible to obtain a wide focus detecting field angle or degrading imaging performance of the focus detecting optical system.

For more concrete description of the Embodiment 1, a numerical data example thereof will be listed below.

NUMERICAL DATA EXAMPLE 1

Figure 14:
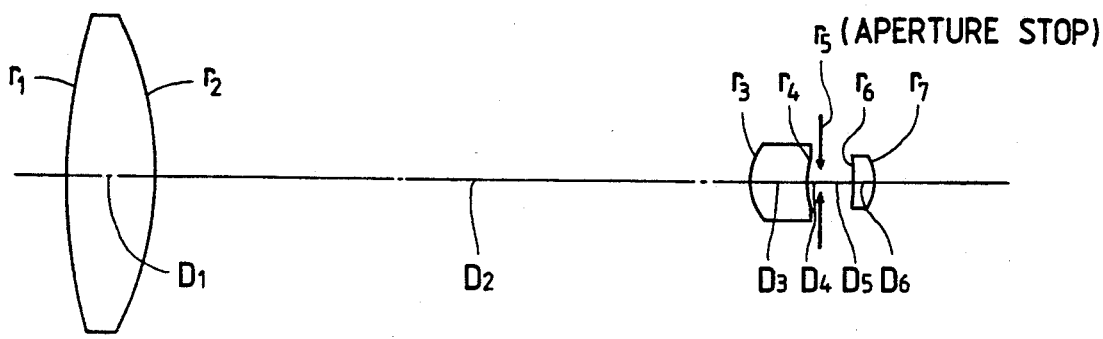
FIG. 14 through FIG. 16 are sectional views illustrating a concrete lens arrangement in the Embodiment 1 shown in FIG. 5.
Figure 28:
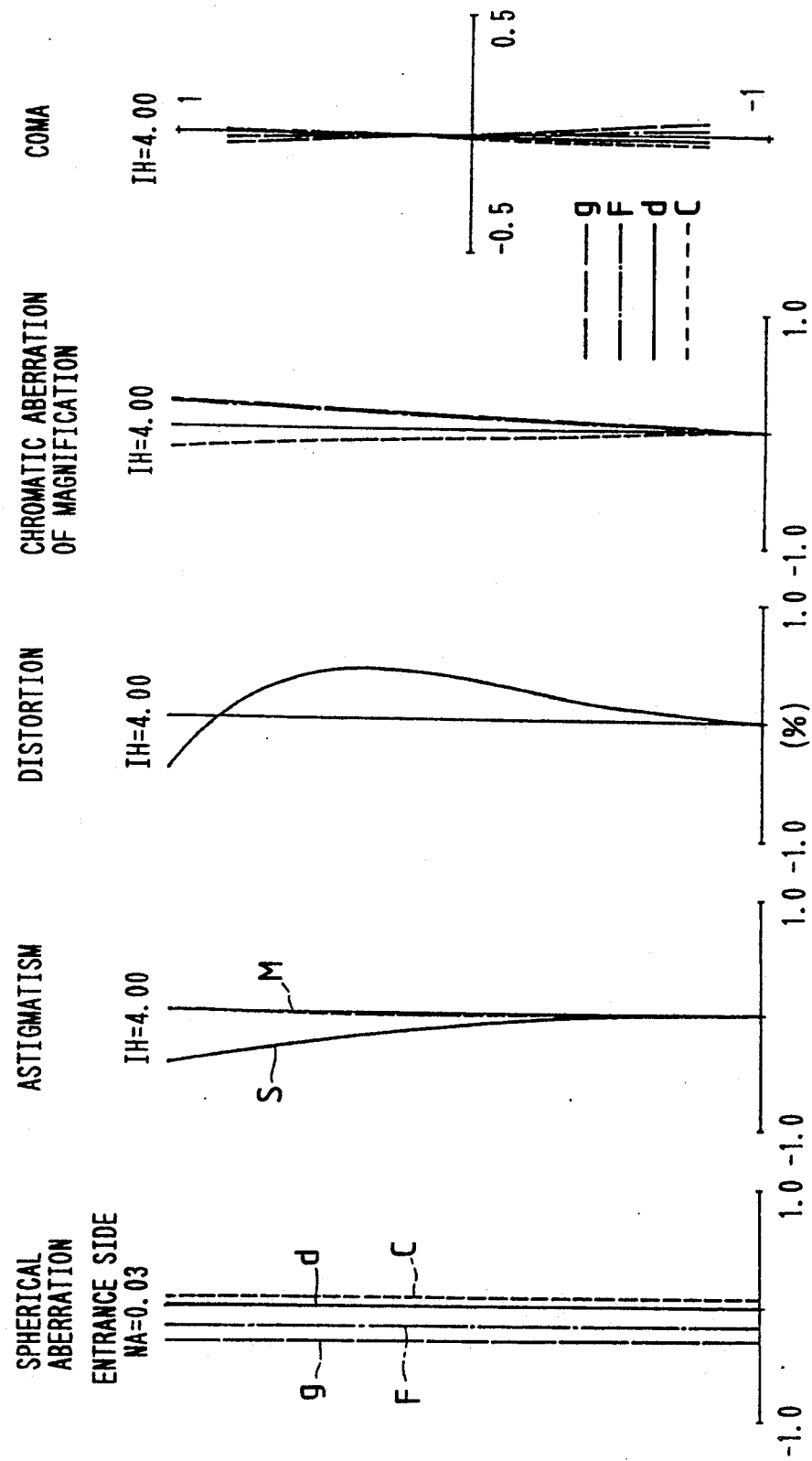
FIG. 28 shown graphs illustrating aberration characteristics of the lens composition shown in FIG. 14.

The composition corresponding to this numerical data example is illustrated in FIG. 14 and aberration characteristics thereof are visualized in FIG. 28.

$f_A = 15.7$     NA = 0.03     IH = 4.00

$r_1 = 65.0753$
    $A_1$
    $D_1 = 13.0000$     $n_1 = 1.49216$     $\nu_1 = 57.50$
$r_2 = -45.3373$
    $D_2 = 85.4068$
$r_3 = 7.7203$
    $D_3 = 8.7587$     $n_2 = 1.49216$     $\nu_2 = 57.50$
$r_4 = 20.5044$
    $A_4$
    $D_4 = 1.4946$
$r_5 = \infty$
(aperture stop)
    $D_5 = 4.8280$
$r_6 = -132.4360$
    $A_6$
    $D_6 = 3.1653$     $n_3 = 1.49216$     $\nu_3 = 57.50$
$r_7 = -6.6663$ $A_{1E} = -0.41345 \times 10^{-5}$     $A_{1F} = -0.54699 \times 10^{-11}$
$A_{4E} = 0.93993 \times 10^{-3}$     $A_{4F} = 0.52044 \times 10^{-5}$
$A_{6E} = -0.73857 \times 10^{-3}$     $A_{6F} = -0.31425 \times 10^{-5}$ $f_1 = 56.5$     $f_2 = 20.5$     $f_3 = 14.2$ $|f_A/f_3| = 1.10$     $|f_2/f_1| = 0.36$

NUMERICAL DATA EXAMPLE 2

Figure 15:
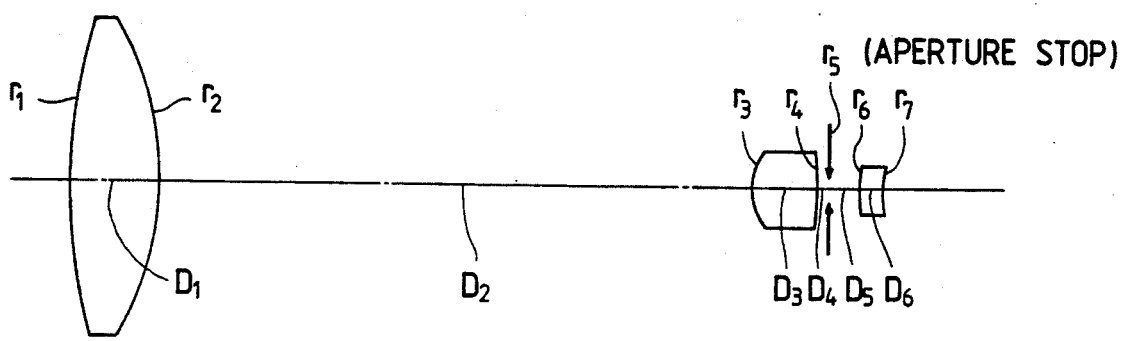
Figure 29:
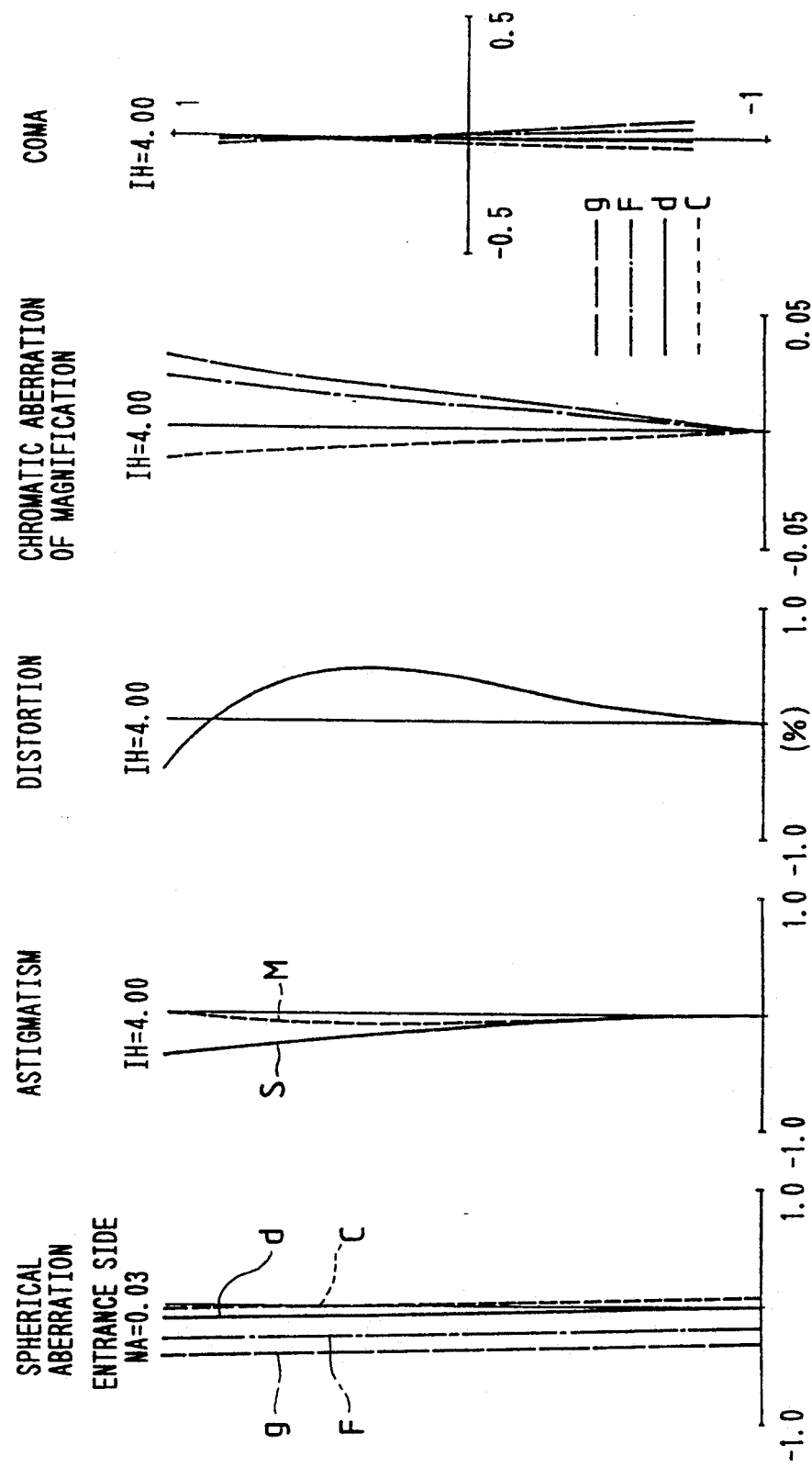
FIG. 29 through FIG. 41 show graphs illustrating aberration characteristics of the lens compositions shown in FIG. 15 through FIG. 27 respectively.
Figure 30:
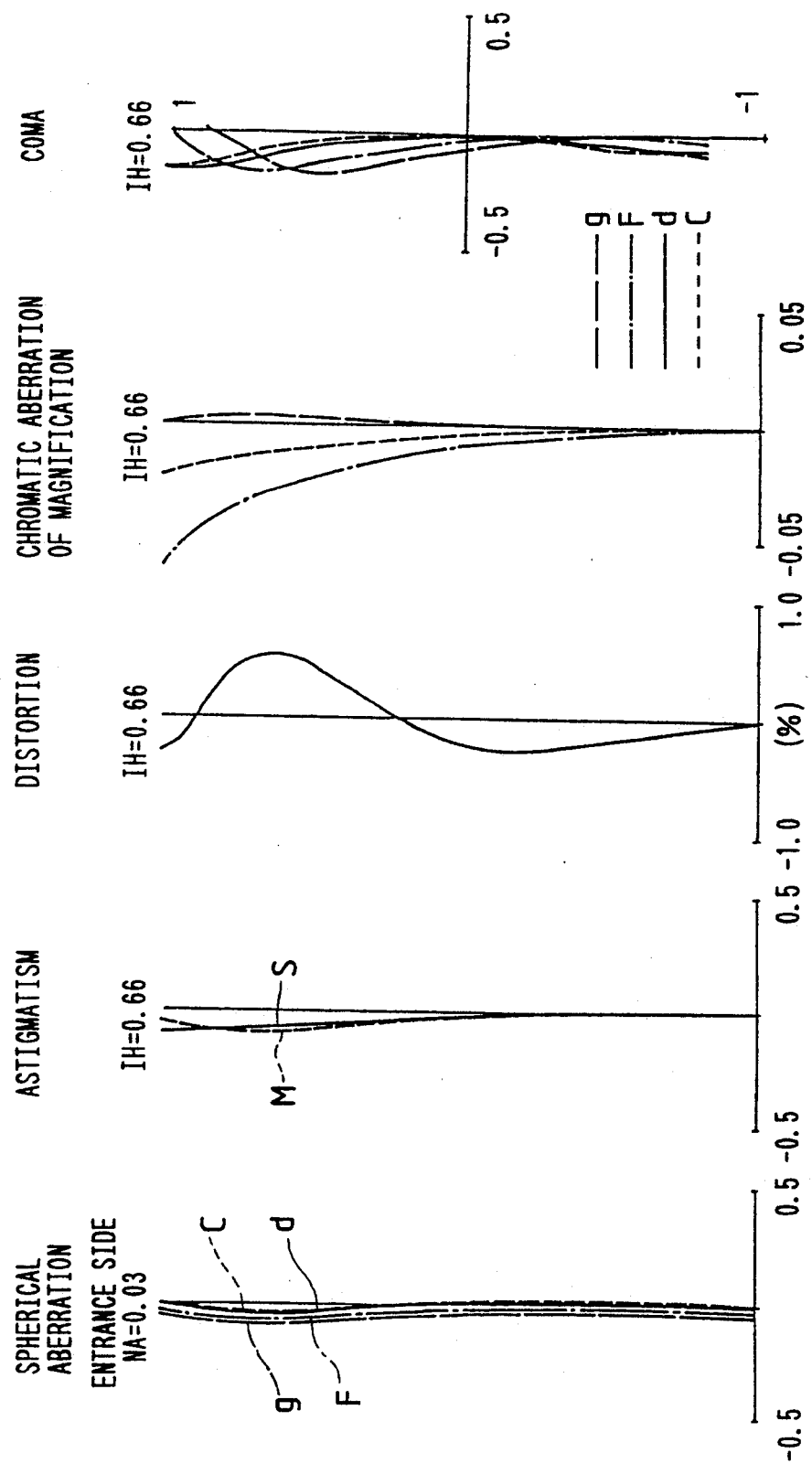

The composition corresponding to this numerical data example is illustrated in FIG. 15 and aberration characteristics thereof are visualized in FIG. 29.

$f_A = 13.9$     NA = 0.03     IH = 4.00

$r_1 = 65.0753$
    $A_1$
    $D_1 = 13.0000$     $n_1 = 1.49216$     $\nu_1 = 57.50$
$r_2 = -45.4083$
    $D_2 = 85.4068$
$r_3 = 8.8775$
    $A_3$
    $D_3 = 9.4130$     $n_2 = 1.49216$     $\nu_2 = 57.50$
$r_4 = -30.8320$
    $D_4 = -1.4946$
$r_5 = \infty$
(aperture stop)
    $D_5 = 4.4724$
$r_6 = 15.3667$
    $A_6$
    $D_6 = 3.1653$     $n_3 = 1.49216$     $\nu_3 = 57.50$
$r_7 = 21.4855$ $A_{1E} = -0.39640 \times 10^{-5}$     $A_{1F} = -0.17713 \times 10^{-10}$
$A_{3E} = -0.98872 \times 10^{-4}$     $A_{3F} = -0.33938 \times 10^{-5}$
$A_{6E} = -0.40024 \times 10^{-3}$     $A_{6F} = -0.17007 \times 10^{-4}$ $f_1 = 56.5$     $f_2 = 15.2$     $f_3 = 93.7$ $|f_A/f_3| = 0.15$     $|f_2/f_1| = 0.27$

NUMERICAL DATA EXAMPLE 3

In this numerical data example, the second lens component 6, which is composed of a single positive lens element in the fundamental composition of the Embodiment 1, consists of two positive lens elements so as to lessen the power burden imposed on each of the lens elements and prevent aggravation of aberrations. The addition of only one lens element does not cause any inconvenience.

$f_A = 1.9$     NA = 0.03     IH = 0.66

$r_1 = 11.5723$
    $A_1$
    $D_1 = 6.0000$     $n_1 = 1.49216$     $\nu_1 = 57.50$
$r_2 = -178.0508$
    $D_2 = 19.5240$
$r_3 = -15.3680$
    $A_3$
    $D_3 = 3.9463$     $n_2 = 1.49216$     $\nu_2 = 57.50$
$r_4 = -7.8167$
    $D_4 = 0.4957$
$r_5 = -2.7414$
    $A_5$
    $D_5 = 1.9215$     $n_3 = 1.58362$     $\nu_3 = 30.37$
$r_6 = -2.7871$
    $D_6 = 0.5087$
$r_7 = \infty$
(aperture stop)
    $D_7 = 0.4995$
$r_8 = 1.5041$
    $A_8$
    $D_8 = 3.0083$     $n_4 = 1.49216$     $\nu_4 = 57.50$
$r_9 = -2.2850$ $A_{1E} = -0.63020 \times 10^{-4}$     $A_{1F} = 0.27756 \times 10^{-7}$
$A_{1G} = -0.62218 \times 10^{-8}$
$A_{3E} = -0.49001 \times 10^{-2}$     $A_{3F} = 0.31461 \times 10^{-2}$
$A_{3G} = -0.75452 \times 10^{-3}$
$A_{5E} = -0.19758 \times 10^{-1}$     $A_{5F} = 0.95636 \times 10^{-2}$
$A_{5G} = -0.16561 \times 10^{-2}$
$A_{8E} = -0.27636 \times 10^{-1}$     $A_{8F} = 0.46258 \times 10^{-1}$
$A_{8G} = -0.36290 \times 10^{-1}$ $f_1 = 22.3$     $f_2 = 12.3$     $f_3 = 2.5$ $|f_A/f_3| = 0.75$     $|f_2/f_1| = 0.55$

EMBODIMENT 2

Figure 6:
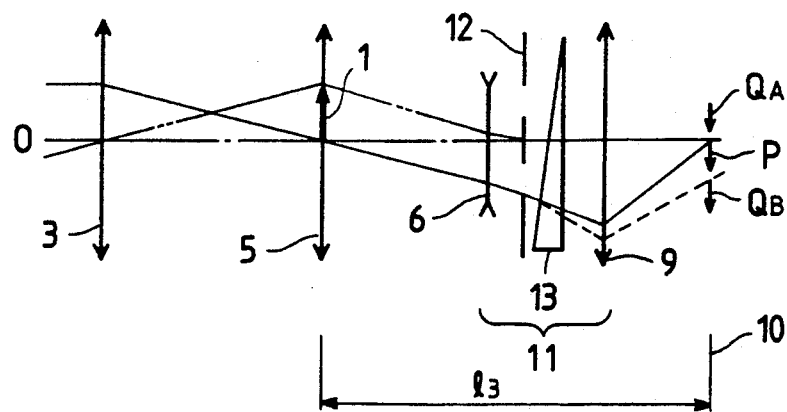

FIG. 6 illustrates the Embodiment 2 of the present invention, wherein a negative lens component is used in place of the positive lens component used as the second lens component 6 in the Embodiment 1 shown in FIG. 5. Since the secondary imaging optical system 11 is of the retrofocus type in this composition of the Embodiment 2, the principal point of the secondary imaging optical system 11 can be brough closer to the secondary image surface 10 with the lens component arranged at the location which is the same as that in the Embodiment 1. Accordingly, the Embodiment 2 permits shortening the focal length $f_A$ and enhancing the contracting magnification since the lens can be located at a position where the paraxial marginal ray and offaxial ray are relatively high. It is therefore possible to correct spherical aberration and coma more effectively by using an aspherical surface on either side of this lens.

Further, it is desirable to design the Embodiment 2 so as to satisfy the following conditions (3) and (4):

$$0.05 \leq |f_A/f_3| \leq 4 \tag{3}$$

$$0.05 \leq |f_2/f_1| \leq 30 \tag{4}$$

If the lower limit of the condition (3) is exceeded, the second lens component 9 will have a weak power in the secondary imaging optical system 11 and the imaging magnification will be too high after production of parallax, thereby undesirably making it necessary to enlarge the photoelectric transducing member or prolong the distance $l_3$. If the upper limit of the condition (3) is exceeded, in contrast, the third lens component 9 will have a strong power in the secondary imaging optical system 11, thereby degrading image quality of aggravating aberrations such as lateral chromatic aberration. Further, since it will be obliged to strengthen the power of the second lens component 6 for reserving the required focal length $f_A$ of the secondary imaging optical system 11, the positive power of the first lens component 5 must be strengthened for maintaining the required focal length $f_B$ of the pupil transmitting optical system 8, thereby undesirably making it impossible to obtain a wide focus detecting field angle under the restriction imposed on the outside diameter due to radius of curvature. If the negative power of the second lens component 6 is so strengthened that the lower limit of the condition (4) is exceeded, the positive power of the first lens component 5 must be strengthened, thereby undesirably making it impossible to reserve the wide focus detecting field angle. If the negative power of the second lens component 6 is so weakened that the upper limit of the condition (4) is exceeded, in constrast, mainly the lateral chromatic aberration will undesirably be undercorrected on the secondary images $Q_A$ and $Q_B$.

Moreover, it is desirable to design the Embodiment 2 so as to satisly the following condition (5):

$$0.3 \leq |\nu_B/\nu_C| \leq 0.9 \tag{5}$$

wherein the reference symbol $\nu_B$ represents Abb's number of the second lens component 6 and the reference symbol $\nu_C$ designates Abbe's number of the third lens component 9.

If the lower limit of the condition (5) is exceeded, the third lens component 9 will have too large an Abbe's number, thereby overcorrecting aberrations on the secondary images $Q_A$ and $Q_B$. If the upper limit of the condition (5) is exceeded, in contrast, the aberrations will undesirably be undercorrected.

Figure 16:
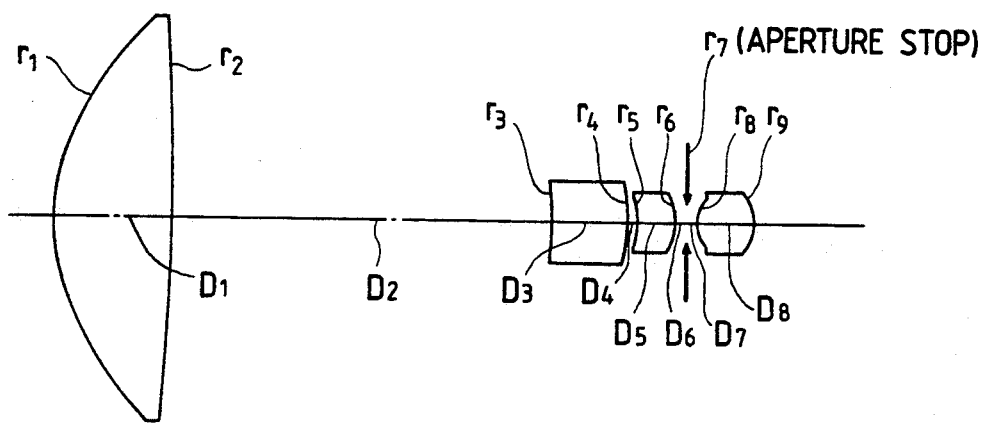
Figure 17:
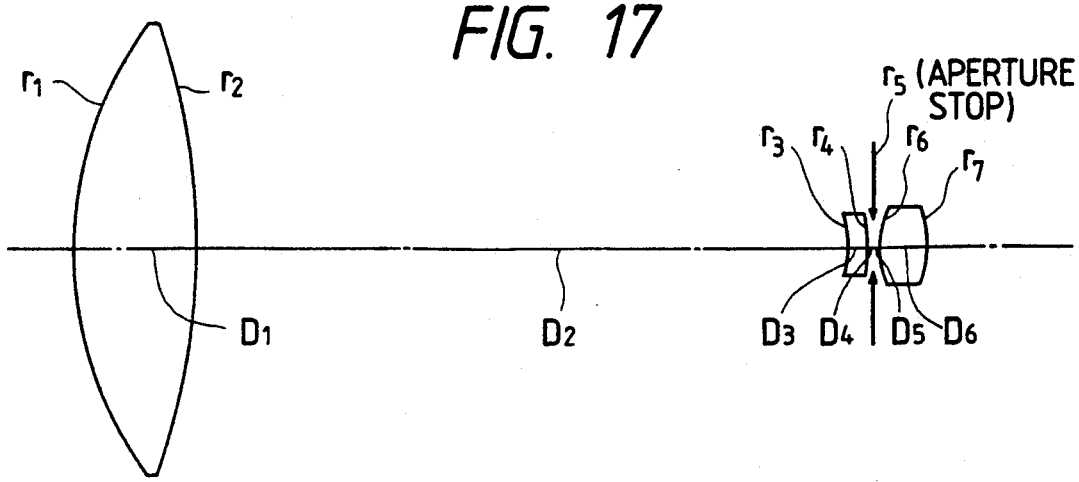
FIG. 17 is a sectional view illustrating a concrete lens arrangement in the Embodiment 2 shown in FIG. 6.
Figure 31:
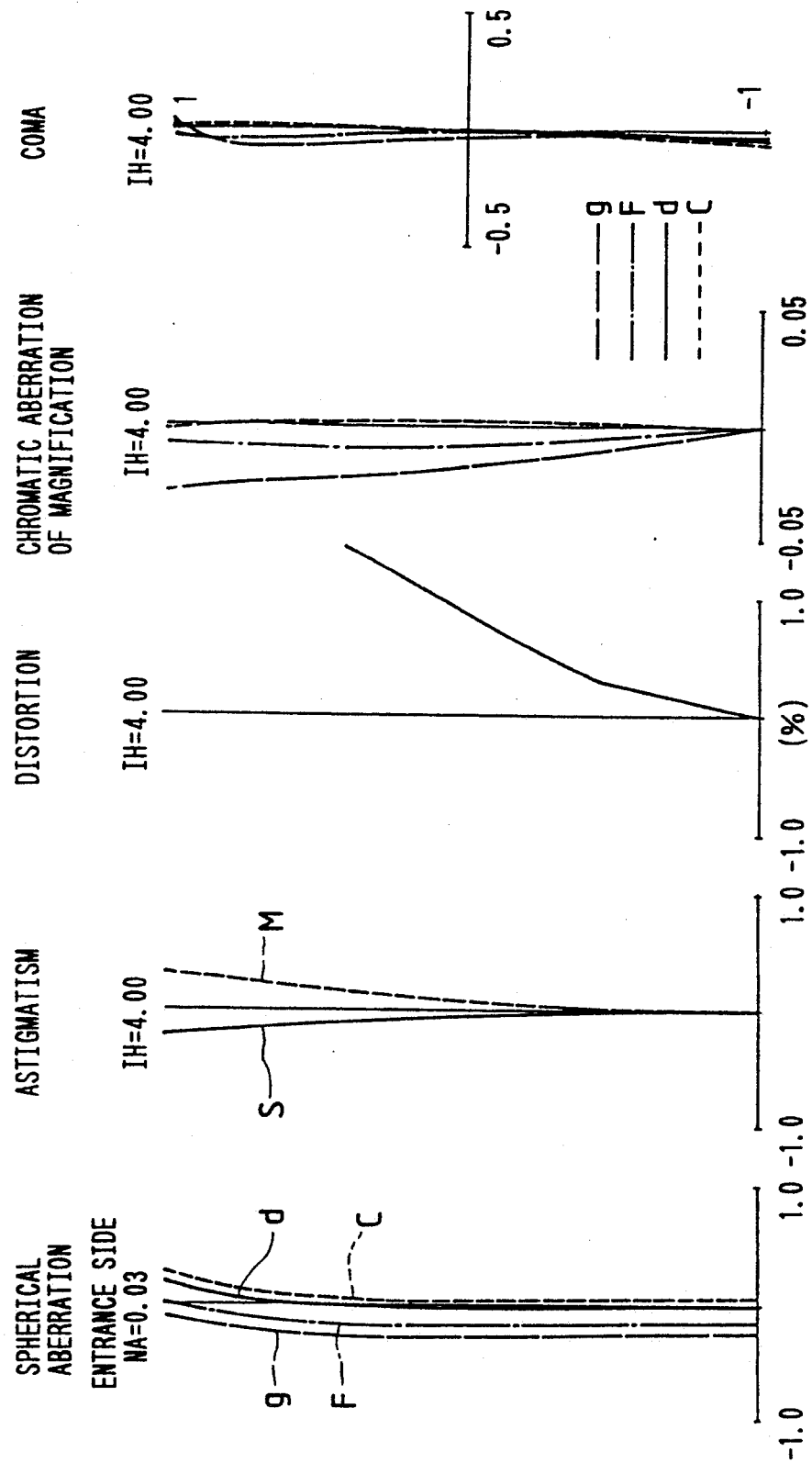

A more concrete composition of the Embodiment 2 will be described as a numerical data example 4. The composition having the numerical data example 4 is illustrated in FIG. 16 and aberration characteristics thereof are visualized in FIG. 31.

NUMERICAL DATA EXAMPLE 4

| $f_A = 12.1$ | NA = 0.03 | IH = 4.00 |
|---|---|---|
| $r_1 = 33.5291$ | | $A_1$ |
| | $D_1 = 13.0000$  $n_1 = 1.49216$ | $\nu_1 = 57.50$ |
| $r_2 = -63.1599$ | | |
| | $D_2 = 67.3280$ | |
| $r_3 = -6.7219$ | | |
| | $D_3 = 2.0000$  $n_2 = 1.58362$ | $\nu_2 = 30.37$ |
| $r_4 = -17.4499$ | | $A_4$ |
| | $D_4 = 0.5778$ | |
| $r_5 = \infty$ (aperture stop) | | |
| | $D_5 = 0.5000$ | |
| $r_6 = 8.5134$ | | |
| | $D_6 = 5.0000$  $n_3 = 1.49216$ | $\nu_3 = 57.50$ |
| $r_7 = -8.3162$ | | $A_7$ |

$P_1 = 1.0000$       $A_{1E} = -0.66420 \times 10^{-5}$
$A_{1F} = -0.12859 \times 10^{-8}$   $A_{1G} = 0.46882 \times 10^{-12}$
$P_4 = 0.2502$       $A_{4E} = 0.79131 \times 10^{-4}$
$A_{4F} = 0.12203 \times 10^{-5}$   $A_{4G} = -0.10492 \times 10^{-6}$
$P_7 = -0.6130$      $A_{7E} = 0.39441 \times 10^{-3}$
$A_{7F} = 0.12003 \times 10^{-4}$   $A_{7G} = 0.41214 \times 10^{-7}$

| $f_1 = 46.6$ | $f_2 = -20.0$ | $f_3 = 9.5$ |
|---|---|---|
| $|f_A/f_3| = 1.27$ | | $|f_2/f_1| = 0.43$ |
| $|\nu_B/\nu_C| = 0.53$ | | |

EMBODIMENT 3

Figure 7:
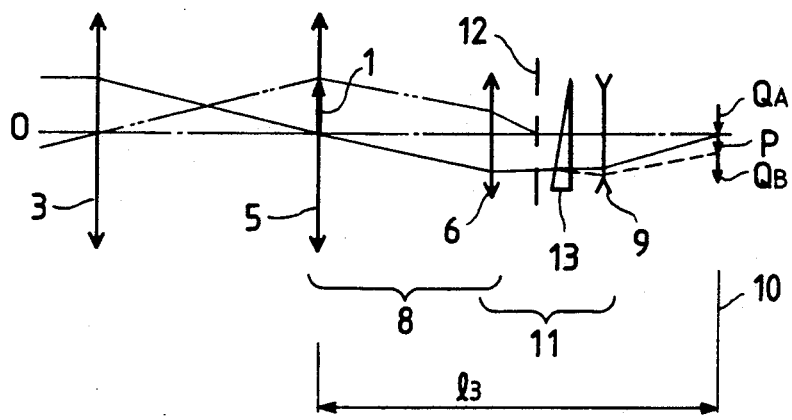

FIG. 7 illustrates the Embodiment 3 of the present invention, wherein a negative lens component is arranged in place of the positive lens component used as the third lens component 9 in the Embodiment 1 shown in FIG. 5. When the secondary imaging optical system 11 is to form an image of the primary image 1 at a contracting magnification, this composition of the Embodiment 3 allows the second lens component 6 to transmit a real image and the third lens component 9 to transmit a virtual image, thereby desirably lessening the power burden on the third lens component 9 which has the function to correct aberrations after the production of parallex.

In addition, it is desirable that the Embodiment 3 is designed so as to satisfy the following conditions (6), (7) and (8):

$$0.05 \leq |f_2/f_1| \leq 10 \tag{6}$$

$$0.05 \leq |f_A/f_2| \leq 4 \tag{7}$$

$$0.3 \leq |\nu_C/\nu_B| \leq 0.9 \tag{8}$$

If the first lens component 5 has so strong a power that the lower limit of the condition (6) is exceeded, there will result in the inconvenience which similar to that produced in the case where the upper limit of the condition (2) is exceeded. If the second lens component 6 has so strong a power that the upper limit of the condition (6) is exceed, in contrast, there will result in the inconvenience which is similar to that produced in the case where the lower limit of the condition (2) is exceeded. If the second lens component 6 has so weak a power in the secondary imaging optical system 11 that the lower limit of the condition (7) is exceeded, it will be obliged to strengthen the power of the first lens component 5 in the secondary imaging optical system 11, thereby resulting in the inconvenience which is similar to that produced in the case where the upper limit of the condition (2) is exceeded, and aberrations will be unbalanced in the pupil transmitting optical system 8, thereby aggravating aberrations in the focus detecting optical system. Further, since the third lens component 9 is composed of the negative lens component, it will be obliged to prolong the distance l₃ for reserving the required imaging magnification of the secondary imaging optical system 11, thereby degrading the compactness of the focus detecting optical system. Moreover, it will be obliged to weaken the negative power of the third lens component 9, thereby undesirable lowering lateral deviation detecting accuracy on the photoelectric transducing member. If the second lens component 6 has so strong a power that the upper limit of the condition (7) is exceeded, in constrast, the third lens component 9 will have a power strengthened for good balance with the positive power, thereby aggravating aberrations. If the lower limit of the condition (8) is exceeded, aberrations will undesirably be overcorrected and, if the upper limit of the condition (8) is exceeded, aberrations will undesirably be undercorrected.

Figure 18:
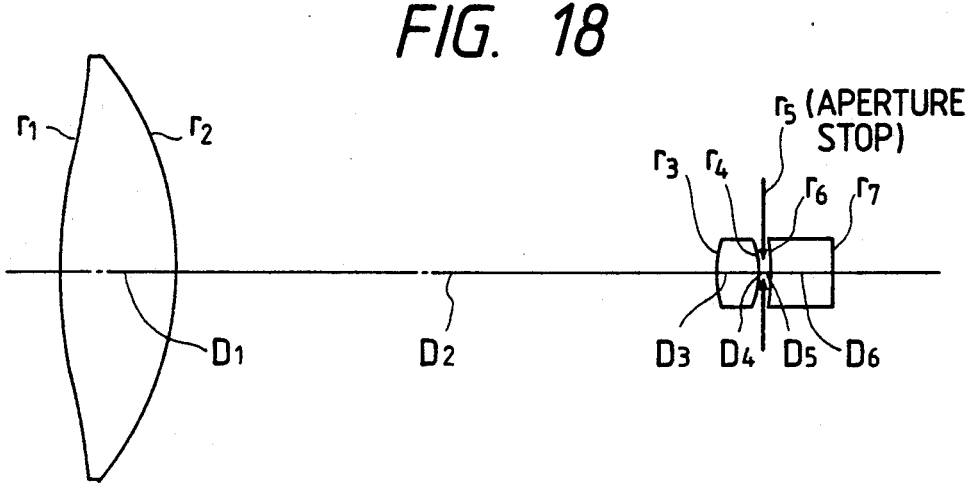
FIG. 18 is a sectional view illustrating a concrete lens arrangement in the Embodiment 3 shown in FIG. 7.
Figure 32:
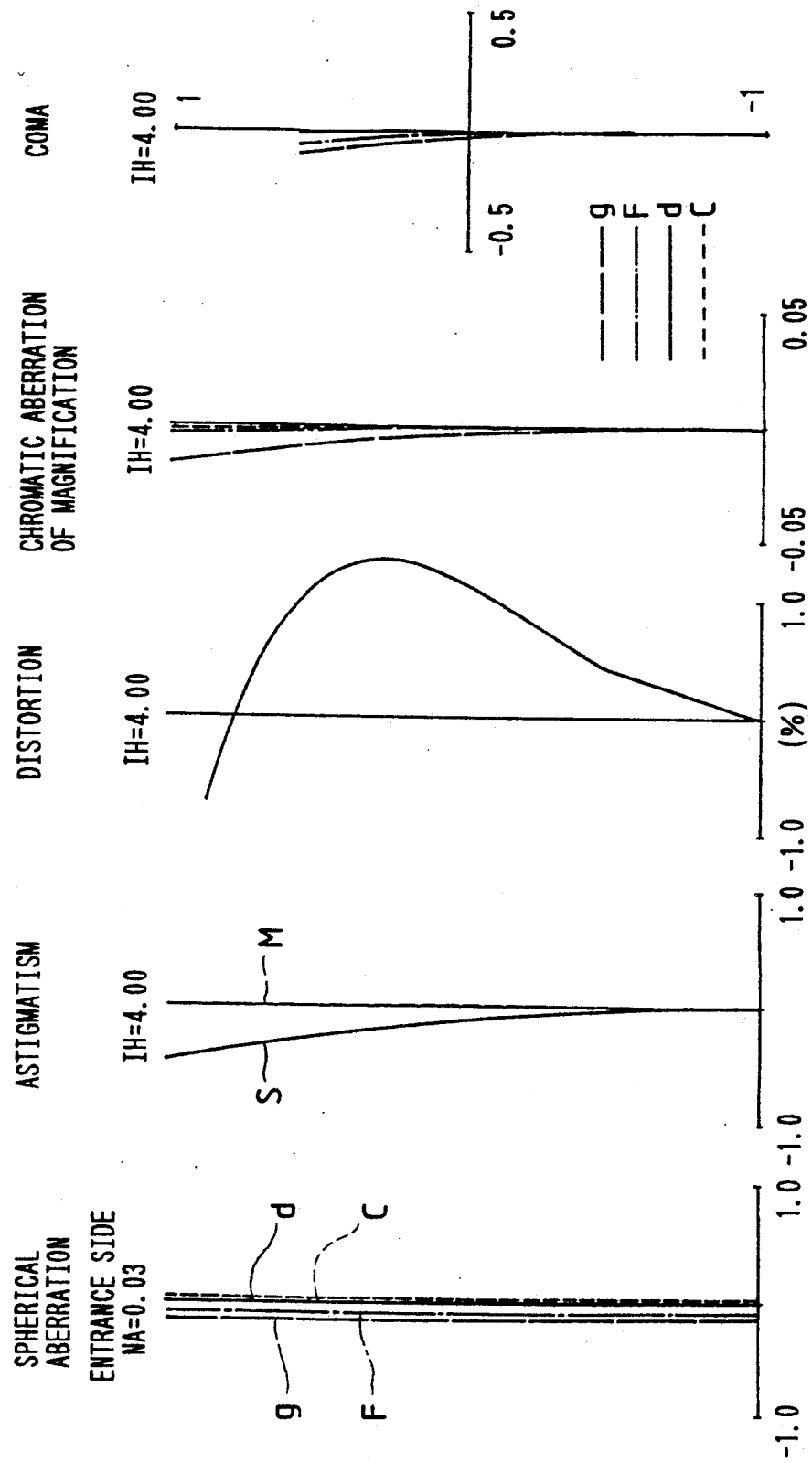

A concrete composition of the Embodiment 3 will be described as the following numerical data example 5. The composition corresponding to the numerical data example 5 is illustrated in FIG. 18 and aberration characteristics thereof are visualized in FIG. 32.

NUMERICAL DATA EXAMPLE 5

| $f_A = 9.9$ | NA = 0.03 | IH = 4.00 | |
|---|---|---|---|
| $r_1 = 48.7324$ | | $A_1$ | |
| | $D_1 = 13.0000$ | $n_1 = 1.49216$ | $\nu_1 = 57.50$ |
| $r_2 = -35.2718$ | | | |
| | $D_1 = 58.5957$ | | |
| $r_3 = 7.5796$ | | $A_3$ | |
| | $D_3 = 4.9285$ | $n_2 = 1.49216$ | $\nu_2 = 57.50$ |
| $r_4 = -6.6631$ | | | |
| | $D_4 = 0.4069$ | | |
| $r_5 = \infty$ | | | |
| (aperture stop) | | | |
| | $D_5 = 0.7757$ | | |
| $r_6 = -14.2897$ | | | |
| | $D_6 = 6.8978$ | $n_3 = 1.58362$ | $\nu_3 = 30.37$ |
| $r_7 = -28.1239$ | | $A_7$ | |

| $P_1 = 1.0000$ | $A_{1E} = -0.88360 \times 10^{-5}$ |
|---|---|
| $A_{1F} = -0.24711 \times 10^{-8}$ | $A_{1G} = 0.16294 \times 10^{-11}$ |
| $P_3 = -0.0376$ | $A_{3E} = -0.56308 \times 10^{-3}$ |
| $A_{3F} = -0.33450 \times 10^{-4}$ | $A_{3G} = -0.19368 \times 10^{-5}$ |
| $P_7 = 43.0276$ | $A_{7E} = 0.18588 \times 10^{-2}$ |
| $A_{7F} = -0.47810 \times 10^{-4}$ | $A_{7G} = 0.59646 \times 10^{-5}$ |

| $f_1 = 43.8$ | $f_2 = 8.1$ |
|---|---|
| $|f_2/f_1| = 0.18$ | $|f_A/f_2| = 1.21$ |
| $|\nu_B/\nu_C| = 0.53$ | |

EMBODIMENT 4

Figure 8:
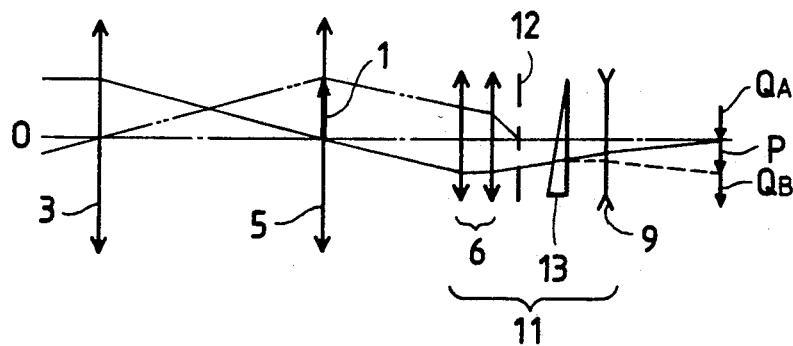

FIG. 8 shows the Embodiment 4 of the present invention, which has a composition using two positive lens elements to compose the second lens component 6 which is composed of a single positive lens element in the Embodiment 3 shown in FIG. 7. When the negative power of the third lens component 9 is strengthened to a certain degree for convenience of lens design, the positive power of the second lens component 6 must also be strengthened for balancing the powers in the secondary imaging optical system 11 as a whole. In the composition of the Embodiment 3 wherein the second lens component 6 is composed of a single positive lens element, however, a very heavy burden for correcting aberrations and a heavy power burden must be imposed on the positive lens element. The composition selected for the Embodiment 4 permits lessening the burdens imposed on the lens elements, thereby enhancing flexibility for lens design and making it easier to obtain favorable imaging performance. Further, the composition of the Embodiment 4 allows to strengthen the power of the third lens component, thereby making it possible to enhance focus detecting accuracy and shorten total length of the focus detecting optical system. It is desirable to design the Embodiment 4 so as to satisfy the following conditions (9) and (10):

$$0.05 \leq |f_{2-1}/f_2| \leq 30 \quad (9)$$

$$0.3 \leq |\nu_C/\nu_D| \leq 0.9 \quad (10)$$

Wherein the reference symbol $f_{2-1}$ represents the focal length of the positive lens element which is located on the object side out of the two positive lens elements composing the second lens component 6 and the reference symbol $\nu_D$ designates the Abbe's number of either of the two positive lens elements. Further, it is also desirable that the Embodiment 4 satisfies the conditions (6) and (7) for the reason already described with reference to the Embodiment 3.

If the positive lens element arranged on the object side in the second lens component 6 has a power occupying so high a ratio that the lower limit of the condition (9) is exceeded, too heavy burdens will be imposed on the lens element arranged on the object side, thereby degrading image quality due to power unbalance between the two lens elements. If the upper limit of the condition (9) is exceeded, in contrast, the lens element arranged on the image side in the second lens component 6 will have too high a power ratio, thereby degrading the imaging performance due to the unbalance similar to that in the case where the lower limit of the condition (9) is exceeded. If the upper or lower limit of the condition (10) is exceeded, there will undesirably result in the inconvenience which is similar to that described with reference to the condition (8).

Figure 19:
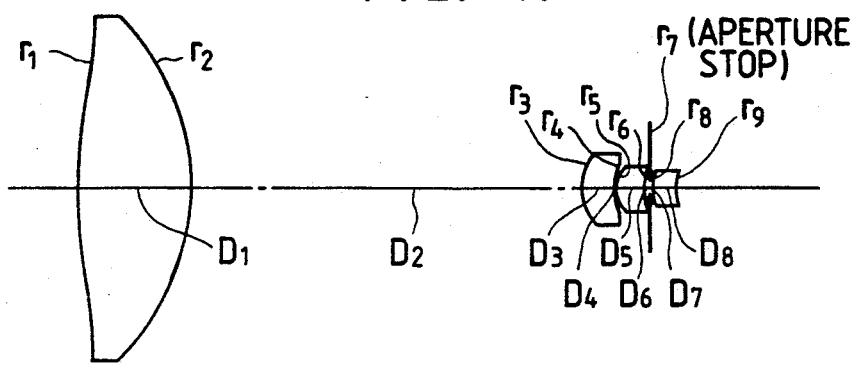
FIG. 19 is a sectional view illustrating a concrete lens arrangement in the Embodiment 4 shown in FIG. 8.
Figure 33:
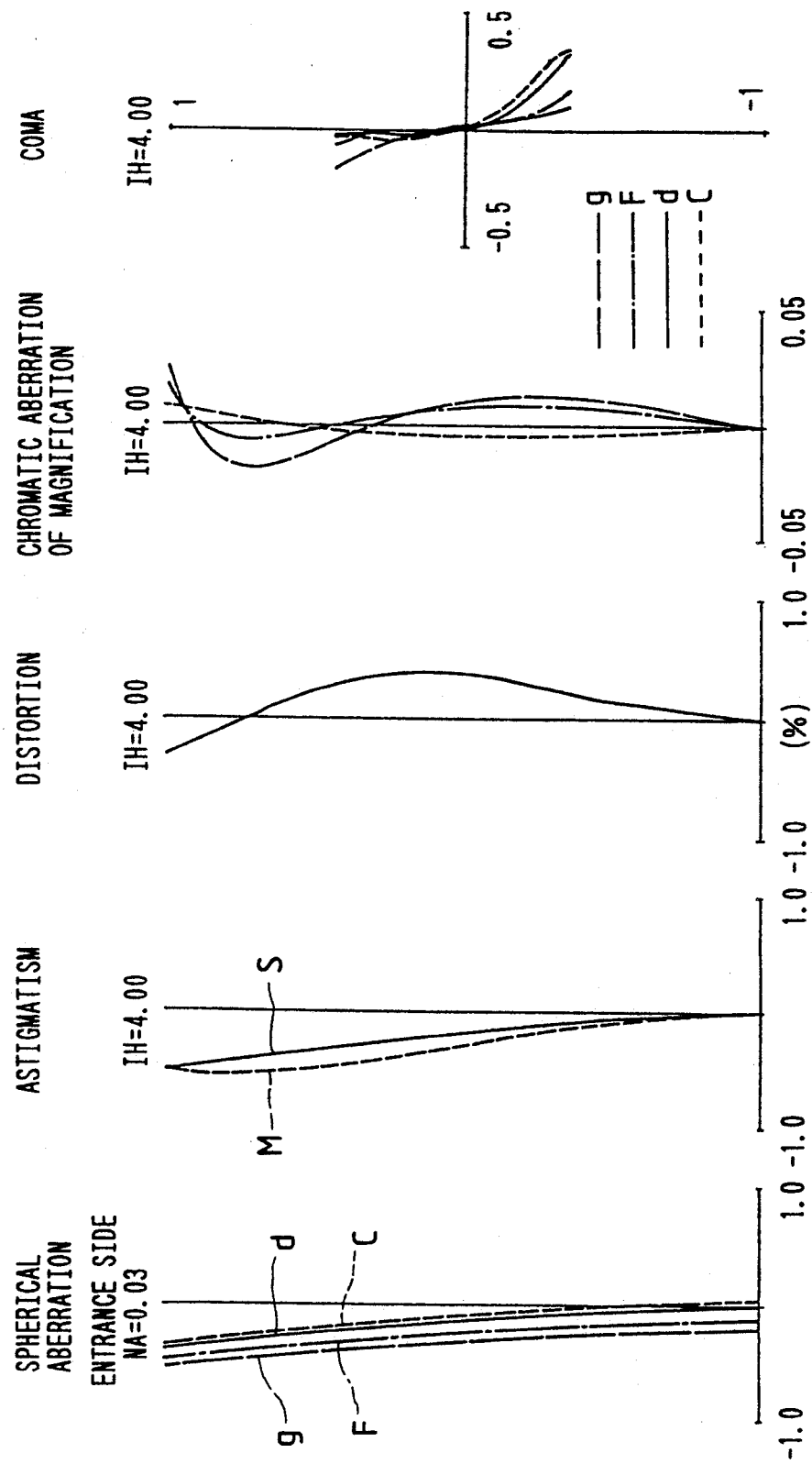

A concrete composition of the Embodiment 4 will be described as a numerical data example 6. The composition corresponding to the numerical data example 6 is illustrated in FIG. 19 and aberration characteristics thereof are visualized in FIG. 33.

NUMERICAL DATA EXAMPLE 6

| $f_A = 8.5$ | NA = 0.03 | IH = 4.00 | |
|---|---|---|---|
| $r_1 = 56.7022$ | | $A_1$ | |
| | $D_1 = 15.0000$ | $n_1 = 1.49216$ | $\nu_1 = 57.50$ |
| $r_2 = -32.9803$ | | | |
| | $D_2 = 52.2664$ | | |
| $r_3 = 6.1486$ | | $A_3$ | |
| | $D_3 = 4.0000$ | $n_2 = 1.49216$ | $\nu_2 = 57.50$ |
| $r_4 = 5.1910$ | | | |
| | $D_4 = 0.5000$ | | |
| $r_5 = 3.9047$ | | | |
| | $D_5 = 4.0000$ | $n_3 = 1.49216$ | $\nu_3 = 57.50$ |
| $r_6 = 42.0563$ | | $A_6$ | |
| | $D_6 = 0.5000$ | | |
| $r_7 = \infty$ | | | |
| (aperture stop) | | | |
| | $D_7 = 0.5000$ | | |

-continued

| $r_8 = 7.4983$ | | | |
|---|---|---|---|
| | $D_8 = 3.3593$ | $n_4 = 1.58362$ | $\nu_4 = 30.37$ |
| $r_9 = 5.9565$ | | $A_9$ | |

| | |
|---|---|
| $A_{1E} = -0.87723 \times 10^{-5}$ | $A_{1F} = -0.36645 \times 10^{-8}$ |
| $A_{1G} = 0.15708 \times 10^{-11}$ | |
| $A_{3E} = -0.36636 \times 10^{-3}$ | $A_{3F} = -0.98605 \times 10^{-5}$ |
| $A_{3G} = -0.66298 \times 10^{-6}$ | |
| $A_{6E} = -0.37860 \times 10^{-2}$ | $A_{6F} = 0.78267 \times 10^{-3}$ |
| $A_{6G} = 0$ | |
| $A_{9E} = -0.65795 \times 10^{-2}$ | $A_{9F} = 0.85696 \times 10^{-3}$ |
| $A_{9G} = 0$ | |

| $f_1 = 44.8$ | $f_2 = 10.2$ | $f_{2-1} = 179.3$ |
|---|---|---|
| $|f_2/f_1| = 0.23$ | $|f_A/f_2| = 0.84$ | |
| $|f_{2-1}/f_2| = 17.60$ | $|\nu_C/\nu_D| = 0.53$ | |

EMBODIMENT 5

Figure 9:
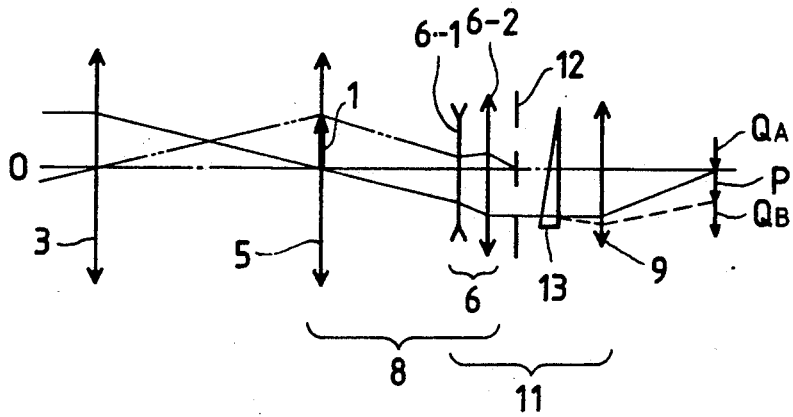

FIG. 9 shows the Embodiment 5 of the present invention. The Embodiment 5 has a composition wherein a negative lens element 6-1 and a positive lens element 6-2 which are arranged in the order from the object side are used in place of the single positive lens element comprising the second lens component 6 in the Embodiment 1 shown in FIG. 5. Since the second lens component 6 is of the retrofocus type in the composition of the Embodiment 5, the secondary imaging optical system 6 can be arranged at a location closer to the first lens component 5 without displacing the principal point of the second lens component 6 which is composed of the single positive lens element in the Embodiment 1. Accordingly, it is possible to correct aberrations effectively by arranging the lens components of the pupil transmitting optical system at locations where the paraxial marginal ray and the marginal ray are high. Further, since the power of the third lens component 9 which is imparted to the single positive lens element can be shared between the positive lens element 6-2 in the second lens component 6 and the positive lens element of the third lens component 9 in the Embodiment 5, the Embodiment 5 makes it possible to design the third lens component 9 so as to have a main function to correct the aberrations to be produced after the production of parallax.

It is desirable to design the Embodiment 5 so as to satisfy the above-mentioned conditions (1) and (2) for the reason described with reference to the Embodiment 1, and further satisfy the following additional conditions (11) and (12):

$$0.01 \leq |f_{2\text{-}2}/f_2| \leq 4 \quad (11)$$

$$0.3 \leq |\nu_E/\nu_F| \leq 0.9 \quad (12)$$

wherein the reference symbol $f_{2\text{-}2}$ represents the focal length of the positive lens element 6-2, and the reference symbols $\nu_E$ and $\nu_F$ designate the Abbe's numbers of the negative lens element 6-1 and the positive lens element 6-2 respectively.

If the positive lens element 6-2 has so strong a power that the lower limit of the condition (11) is exceeded, it will be obliged to strengthen the power of the negative lens element 6-1 for balancing powers in the second lens component 6 and the rays are subjected to remarkable power variation between these two lens elements, thereby degrading the imaging performance of the pupil transmitting optical system 8 and the secondary imaging optical system 11. If the positive lens element 6-2 has so weak a power that the upper limit of the condition (11) is exceeded, in contrast, the third lens component must bear too heavy a burden of the positive power for obtaining the predetermined imaging magnification, thereby aggravating aberrations. If the upper or lower limit of the condition (12) is exceeded, there will undesirably result in the inconvenience similar to that caused where the upper or lower limit of the condition (8) is exceeded.

Figure 20:
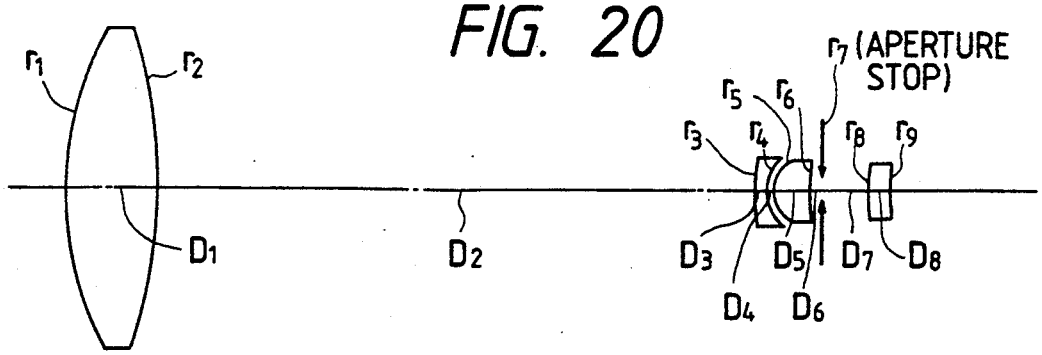
FIG. 20 and FIG. 21 are sectional views illustrating concrete lens arrangements in the Embodiment 5 shown in FIG. 9.
Figure 21:
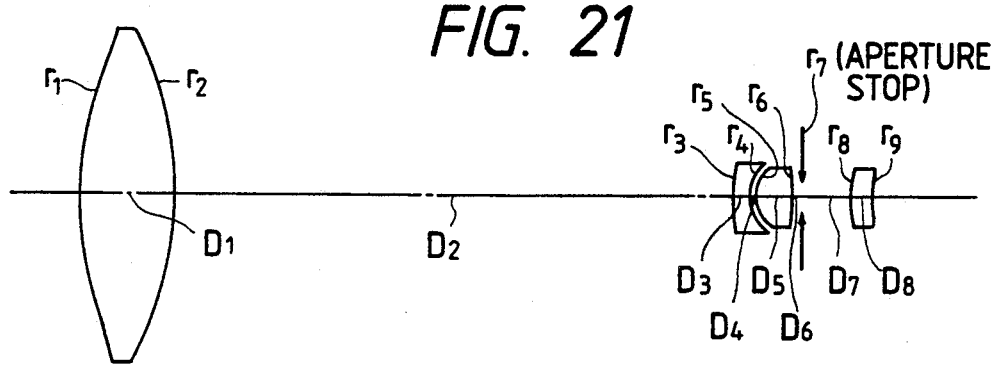
Figure 34:
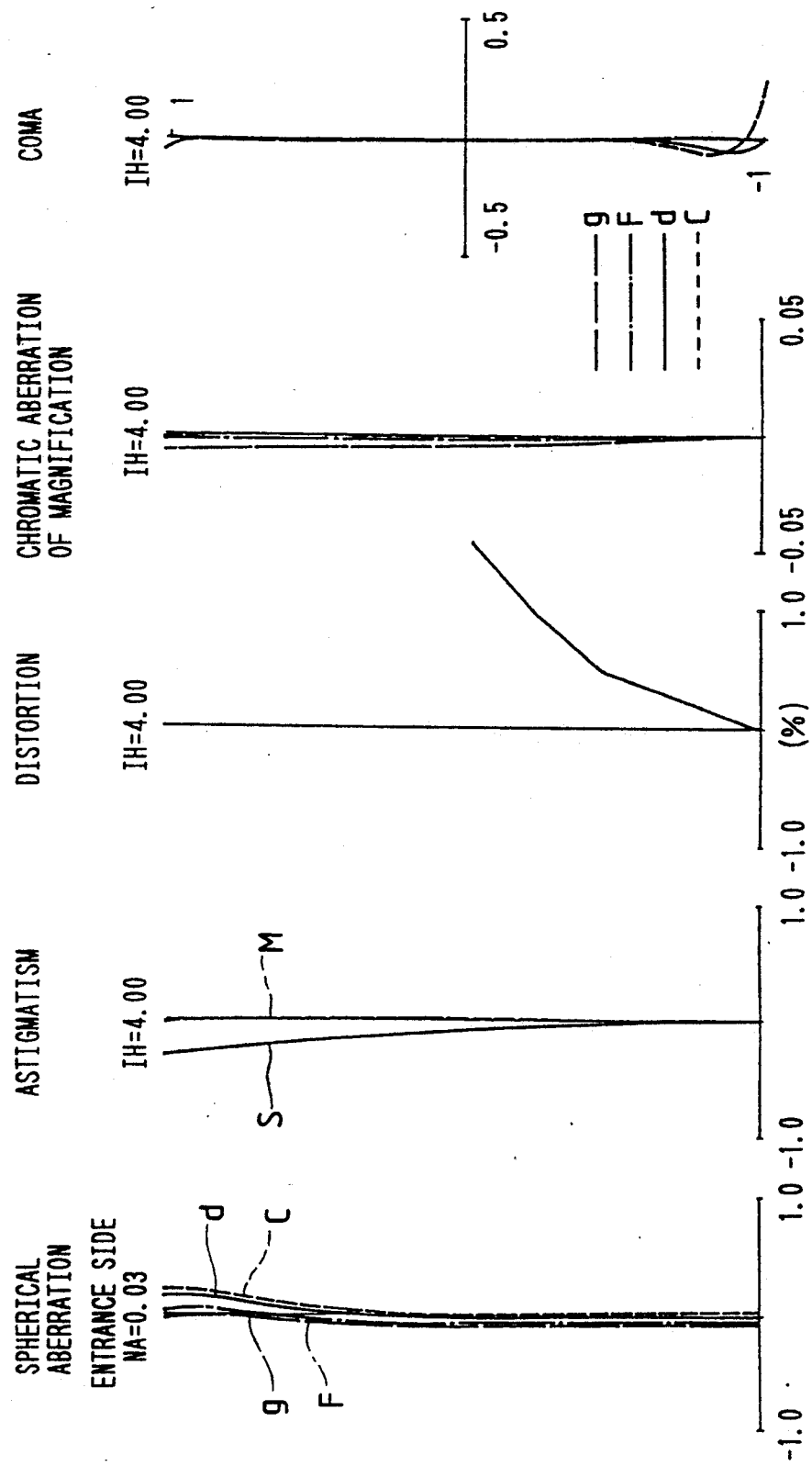
Figure 35:
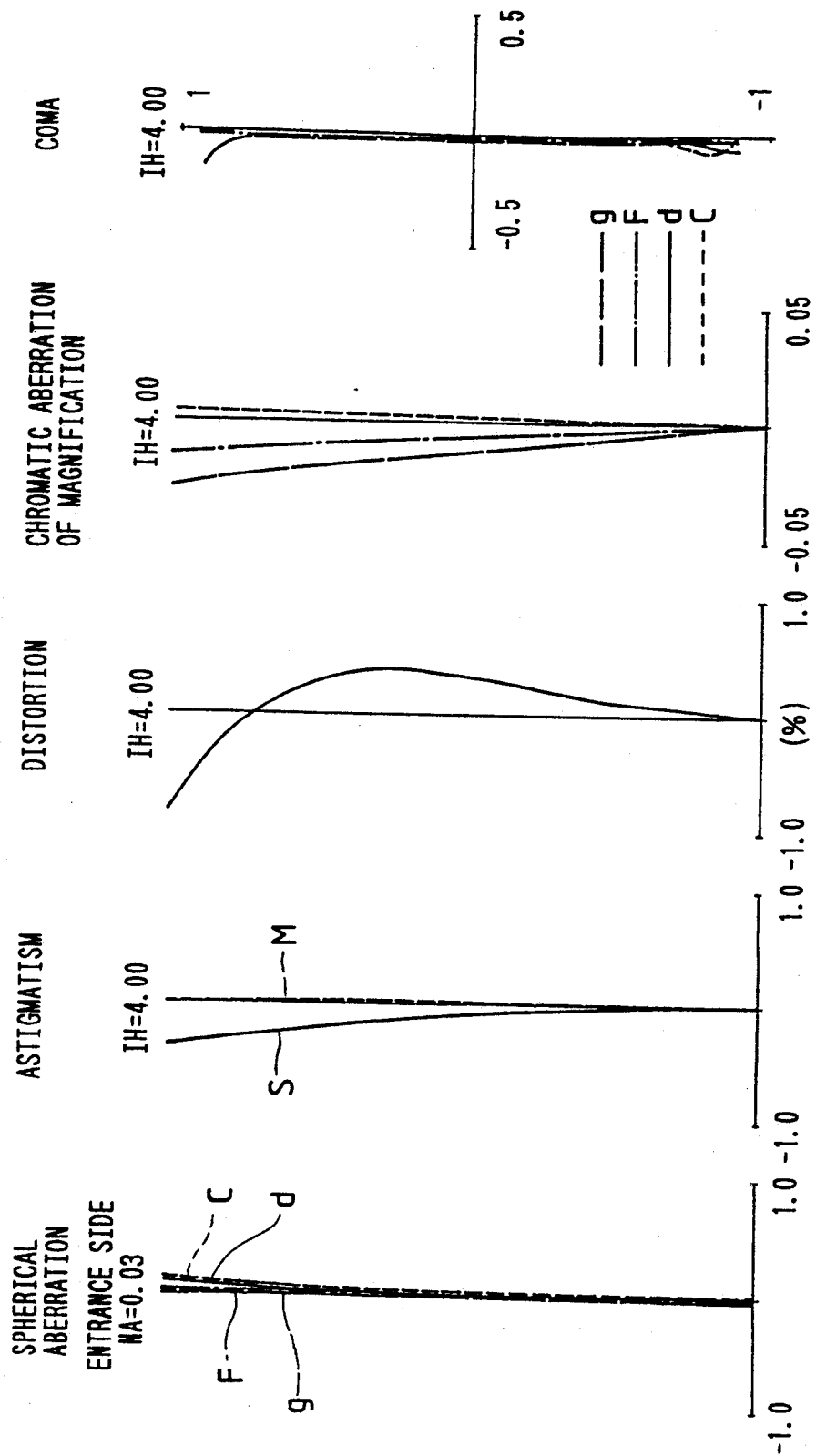

Concrete compositions of the Embodiment 5 will be described below as numerical data examples 7 and 8. The composition corresponding to the numerical data example 7 is illustrated in FIG. 20 and aberration characteristics thereof are visualized in FIG. 34. The composition and aberration characteristics corresponding to the numerical data example 8 are shown in FIG. 21 and FIG. 35 respectively.

NUMERICAL DATA EXAMPLE 7

| $f_A = 14.2$ | NA = 0.03 | IH = 4.00 | |
|---|---|---|---|
| $r_1 = 39.9876$ | | $A_1$ | |
| | $D_1 = 13.0000$ | $n_1 = 1.49216$ | $\nu_1 = 57.50$ |
| $r_2 = -71.1030$ | | | |
| | $D_2 = 81.9600$ | | |
| $r_3 = 14.1857$ | | | |
| | $D_3 = 2.0000$ | $n_2 = 1.58362$ | $\nu_2 = 30.37$ |
| $r_4 = 5.5401$ | | $A_4$ | |
| | $D_4 = 0.9475$ | | |
| $r_5 = 4.6548$ | | | |
| | $D_5 = 5.0000$ | $n_3 = 1.49216$ | $\nu_3 = 57.50$ |
| $r_6 = -29.6042$ | | $A_6$ | |
| | $D_6 = 1.4946$ | | |
| $r_7 = \infty$ (aperture stop) | | | |
| | $D_7 = 6.4751$ | | |
| $r_8 = 12.8056$ | | $A_8$ | |
| | $D_8 = 3.1653$ | $n_4 = 1.49216$ | $\nu_4 = 57.50$ |
| $r_9 = 20.7678$ | | | |

| | |
|---|---|
| $P_1 = 1.0000$ | $A_{1E} = -0.41361 \times 10^{-5}$ |
| $A_{1F} = -0.54227 \times 10^{-9}$ | $A_{1G} = -0.36351 \times 10^{-12}$ |
| $P_4 = 0.9990$ | $A_{4E} = 0.23665 \times 10^{-3}$ |
| $A_{4F} = 0.15401 \times 10^{-4}$ | $A_{4G} = -0.80462 \times 10^{-6}$ |
| $P_6 = -6.0298$ | $A_{6E} = 0.75438 \times 10^{-3}$ |
| $A_{6F} = 0.46341 \times 10^{-4}$ | $A_{6G} = 0.10398 \times 10^{-4}$ |
| $P_8 = 1.0073$ | $A_{8E} = -0.66737 \times 10^{-3}$ |
| $A_{8F} = 0.23713 \times 10^{-4}$ | $A_{8G} = -0.11217 \times 10^{-5}$ |

| $f_1 = 54.1$ | $f_2 = 16.3$ | $f_3 = 60.0$ |
|---|---|---|
| $f_{2-2} = 8.6$ | | |
| $|f_A/f_3| = 0.24$ | $|f_2/f_1| = 0.30$ | |
| $|f_{2-2}/f_2| = 0.53$ | $|\nu_E/\nu_F| = 0.53$ | |

NUMERICAL EXAMPLE 8

| $f_A = 13.8$ | NA = 0.03 | IH = 4.00 | |
|---|---|---|---|
| $r_1 = 46.1843$ | | $A_1$ | |
| | $D_1 = 13.0000$ | $n_1 = 1.49216$ | $\nu_1 = 57.50$ |
| $r_2 = -52.4999$ | | | |
| | $D_1 = 77.1749$ | | |
| $r_3 = 17.3030$ | | | |
| | $D_3 = 2.0000$ | $n_2 = 1.58362$ | $\nu_2 = 30.37$ |
| $r_4 = 5.4916$ | | $A_4$ | |
| | $D_4 = 0.9294$ | | |
| $r_5 = 4.7910$ | | | |
| | $D_5 = 5.0000$ | $n_3 = 1.49216$ | $\nu_3 = 57.50$ |
| $r_6 = -28.7008$ | | $A_6$ | |
| | $D_6 = 1.4946$ | | |
| $r_7 = \infty$ (aperture stop) | | | |
| | $D_7 = 6.5519$ | | |
| $r_8 = 10.0792$ | | $A_8$ | |
| | $D_8 = 3.1653$ | $n_4 = 1.49216$ | $\nu_4 = 57.50$ |
| $r_9 = 49.3295$ | | | |
| $P_1 = 1.0000$ | | $A_{1E} = -0.45078 \times 10^{-5}$ | |
| $A_{1F} = -0.43136 \times 10^{-9}$ | | $A_{1G} = 0.46048 \times 10^{-13}$ | |
| $P_4 = 0.9990$ | | $A_{4E} = 0.22781 \times 10^{-3}$ | |

-continued

| | |
|---|---|
| $A_{4F} = 0.13570 \times 10^{-4}$ | $A_{4G} = -0.75100 \times 10^{-6}$ |
| $P_6 = 1.8877$ | $A_{6E} = 0.72883 \times 10^{-3}$ |
| $A_{6F} = -0.50858 \times 10^{-7}$ | $A_{6G} = -0.10132 \times 10^{-4}$ |
| $P_8 = 2.4979$ | $A_{8E} = -0.60957 \times 10^{-3}$ |
| $A_{8F} = 0.13217 \times 10^{-4}$ | $A_{8G} = -0.67859 \times 10^{-6}$ |

| | | |
|---|---|---|
| $f_1 = 52.2$ | $f_2 = 19.2$ | $f_3 = 25.1$ |
| $f_{2-2} = 8.8$ | | |

| | |
|---|---|
| $\|f_A/f_3\| = 0.55$ | $\|f_2/f_1\| = 0.37$ |
| $\|f_{2-2}/f_2\| = 0.46$ | $\|\nu_E/\nu_F\| = 0.53$ |

EMBODIMENT 6

FIG. 10 illustrates the Embodiment 6 of the present invention. The Embodiment 6 has a composition wherein a positive lens element 6-3 and a negative lens element 6-4 arranged in the order from the object side are used in place of the single positive lens element composing the second lens component 6 in the Embodiment 1 shown in FIG. 5. Since the second lens component 6 is of the telephoto type in the composition of the Embodiment 6, this Embodiment permits arranging the secondary imaging optical system at a location closer to the aperture stop 12 without displacing the principal point of the second lens component 6 which is composed of the single lens element in the Embodiment 1. Accordingly, the Embodiment 6 makes it possible to correct aberrations effectively by arranging the lens elements at locations at which the paraxial marginal ray and the marginal ray are high in the secondary imaging optical system 11. Further, since the power of the third lens component 9 which is imparted to the single positive lens element in the Embodiment 2 can be shared between the positive lens element 6-3 arranged in the second lens component 6 and the positive lens element of the third lens component 9 in the Embodiment 6, the third lens component 9 can be designed so as to have a main function to correct aberrations to be produced after the production of parallax. Moreover, when the second lens component 6 has a positive total power, it is desirable to design the Embodiment 6 so as to satisfy the above-mentioned conditions (1) and (2) for the reason described with reference to the Embodiment 1, and further satisfy the following additional conditions (13) and (14):

$$0.05 \leq |f_{2-3}/f_2| \leq 3 \quad (13)$$

$$0.3 \leq |\nu_G/\nu_H| \leq 0.9 \quad (14)$$

wherein the reference symbol $f_{2-3}$ represents the focal length of the positive lens element 6-3 and the reference symbols $\nu_G$ and $\nu_H$ designate the Abbe's numbers of the positive lens element 6-3 and the negative lens element 6-4 respectively.

If the positive lens element 6-3 has so strong a power that the lower limit of the condition (13) is exceeded, it will be obliged to strengthen the power of the negative lens element 6-4 for balancing powers in the second lens component 6. Accordingly, rays are abruptly varied between these two lens elements, thereby aggravating aberrations in the pupil transmitting optical system 8 and the secondary imaging optical system 11. If the positive lens element 6-3 has so weak a power that the upper limit of the condition (13) is exceeded, in contrast, the third lens component 9 must have a heavy burden of the positive power for obtaining the predetermined imaging magnification, thereby aggravating aberrations. If the upper or lower limit of the condition (14) is exceeded, there will undesirably result in the inconvenience similar to that caused in the case where the upper or lower limit of the condition (8) is exceeded.

Figure 22:
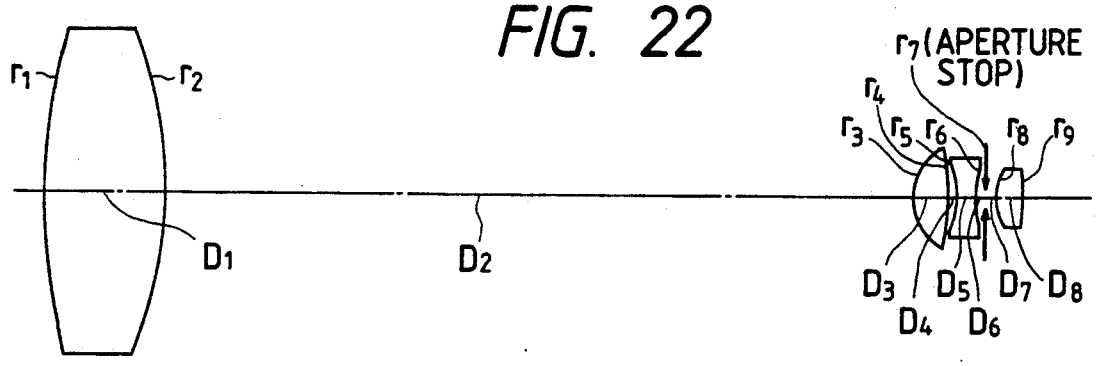
FIG. 22 through FIG. 24 are sectional views illustrating concrete lens arrangements in the Embodiment 6 shown in FIG. 10.
Figure 36:
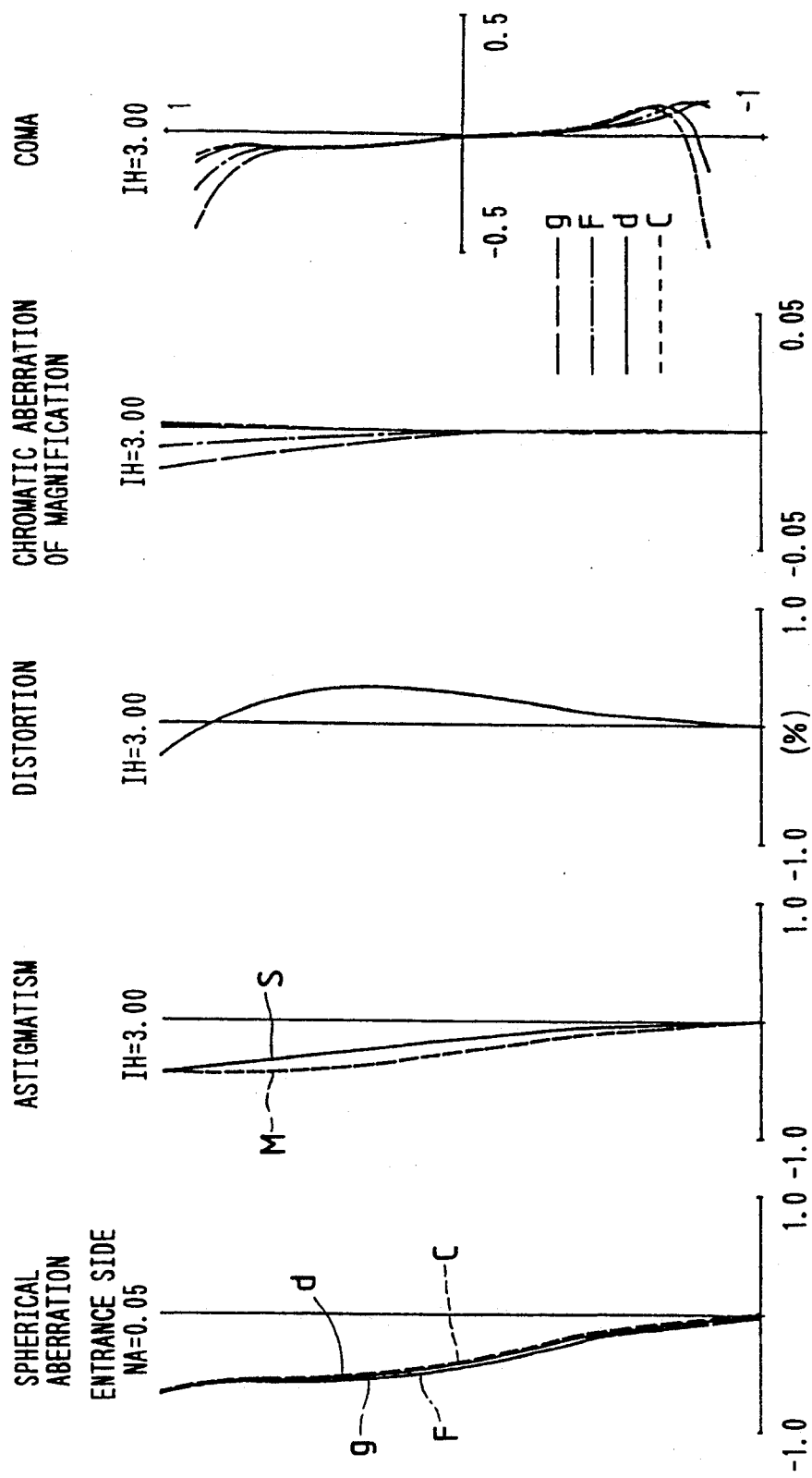

A concrete composition of the Embodiment 6 wherein the second lens component has a positive total power will be described below as a numerical data example 9. The composition and aberration characteristics corresponding to the numerical data example 9 are shown in FIG. 22 and FIG. 36 respectively.

NUMERICAL DATA EXAMPLE 9

| $f_A = 13.5$ | NA = 0.05 | IH = 3.00 | |
|---|---|---|---|
| $r_1 = 57.7714$ | | $A_1$ | |
| | $D_1 = 13.0000$ | $n_1 = 1.49216$ | $\nu_1 = 57.50$ |
| $r_2 = -45.5187$ | $D_2 = 79.5000$ | | |
| $r_3 = 6.2586$ | | $A_3$ | |
| | $D_3 = 3.9463$ | $n_2 = 1.49216$ | $\nu_2 = 57.50$ |
| $r_4 = -24.2806$ | $D_4 = 0.8697$ | | |
| $r_5 = -9.2931$ | | | |
| | $D_5 = 1.9215$ | $n_3 = 1.58362$ | $\nu_3 = 30.37$ |
| $r_6 = 10.9012$ | $D_6 = 1.5810$ | | |
| $r_7 = \infty$ | | | |
| (aperture stop) | $D_7 = 0.5000$ | | |
| $r_8 = 6.5187$ | | | |
| | $D_8 = 3.0083$ | $n_4 = 1.49216$ | $\nu_4 = 57.50$ |
| $r_9 = -20.0258$ | | $A_9$ | |

| | |
|---|---|
| $A_{1E} = -0.44652 \times 10^{-5}$ | $A_{1F} = -0.14646 \times 10^{-9}$ |
| $A_{1G} = 0.81779 \times 10^{-13}$ | |
| $A_{3E} = 0.22189 \times 10^{-3}$ | $A_{3F} = -0.21068 \times 10^{-4}$ |
| $A_{3G} = 0.93656 \times 10^{-6}$ | |
| $A_{9E} = -0.42892 \times 10^{-4}$ | $A_{9F} = 0.27373 \times 10^{-3}$ |
| $A_{9G} = -0.16050 \times 10^{-4}$ | |

| | | |
|---|---|---|
| $f_1 = 54.0$ | $f_2 = 65.0$ | $f_3 = 10.4$ |
| $f_{2-3} = 10.6$ | | |

| | |
|---|---|
| $\|f_A/f_3\| = 1.30$ | $\|f_2/f_1\| = 1.20$ |
| $\|f_{2-3}/f_2\| = 0.16$ | $\|\nu_G/\nu_H\| = 0.53$ |

When the second lens component 6 has a negative total power, it is desirable to design the Embodiment 6 so as to satisfy the above-mentioned conditions (3), (4) and (14) for the reasons described with reference to the embodiments satisfying these conditions, and further satisfy the following conditions (15):

$$0.01 \leq |f_{2-4}/f_A| \leq 4 \quad (15)$$

wherein the reference symbol $f_{2-4}$ represents the focal length of the negative lens element 6-4.

If the negative lens element 6-4 has so strong a power that the lower limit of the condition (15) is exceeded, the second lens component 6 will have a strong negative power as a whole, and the lens system composed of the second lens component 6 and the third lens component 9 will be of too high retrofocus degree, thereby aggravating lateral chromatic aberration and the other aberrations. Along with this aggravation, the first lens component will have a stronger power and higher curvature, thereby narrowing the focus detecting field angle of the focus detecting optical system. If the negative lens element 6-4 arranged in the second lens component 6 has so weak a power that the upper limit of the condition (15) is exceeded, in contrast, the retrofocus degree will be too low, thereby undesirably lowering the contracting magnification and making it impossible to arrange the lens elements at locations suited for favorable correction of aberrations.

Figure 23:
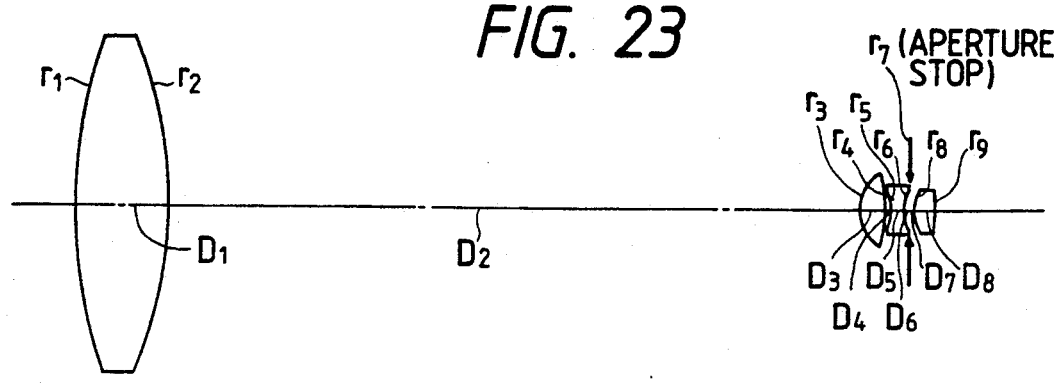
Figure 24:
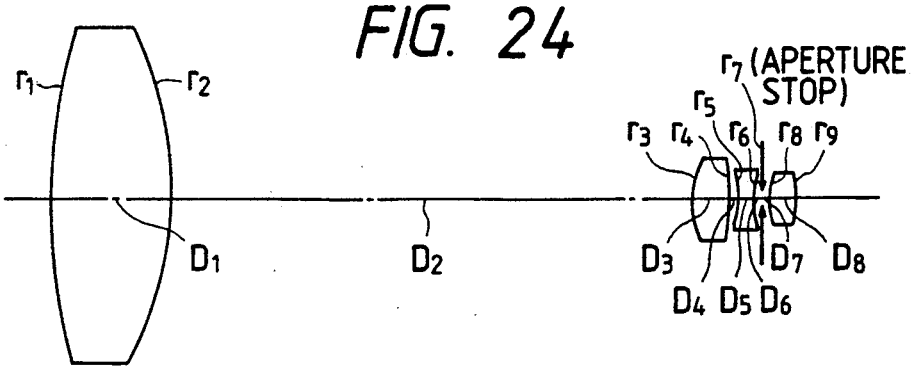
Figure 37:
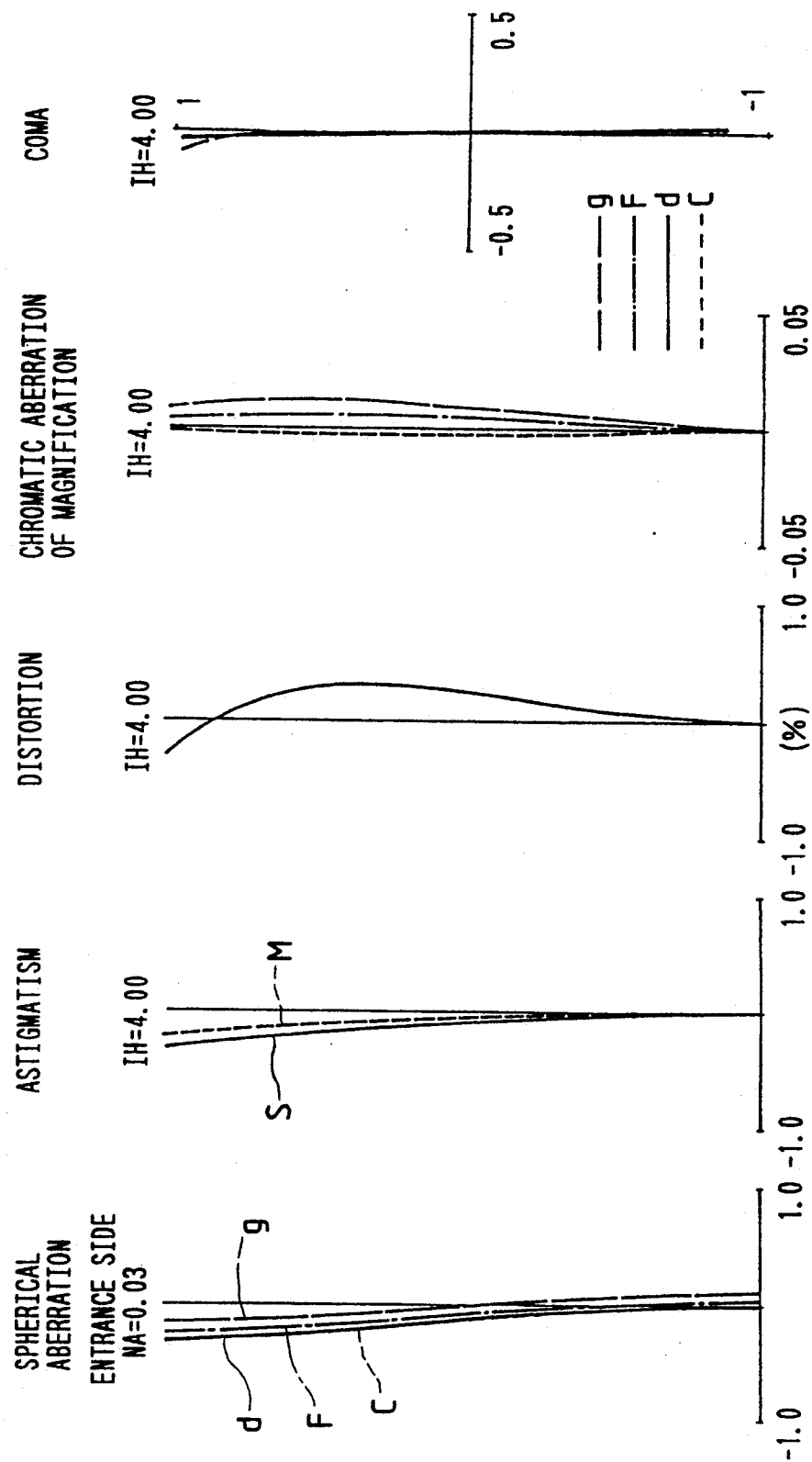
Figure 38:
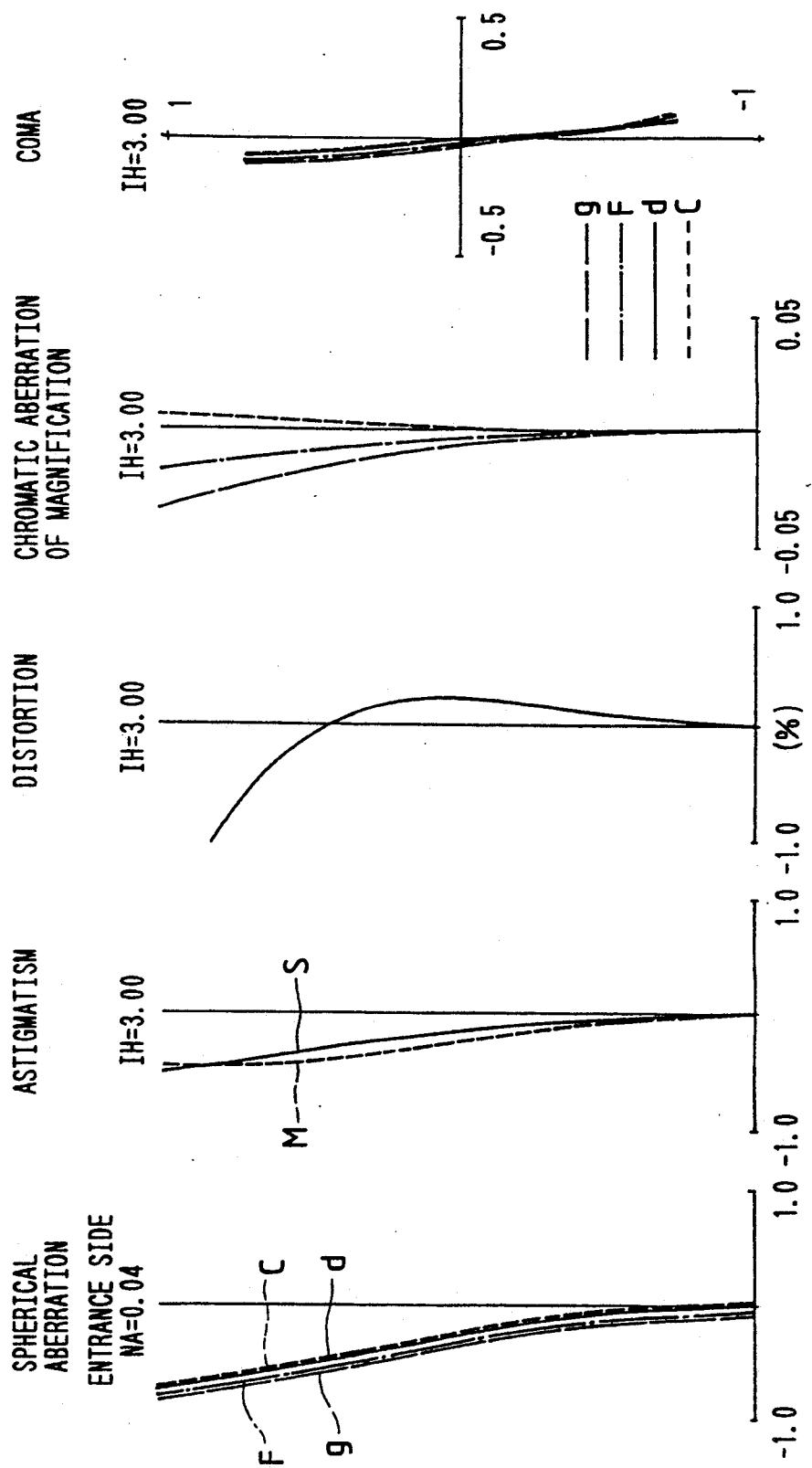

Concrete compositions of the Embodiment 6 which comprises the second lens component 6 having a negative total power will be described as the following numerical data examples 10 and 11. The compositions corresponding to the numerical data examples 10 and 11 are illustrated in FIG. 23 and FIG. 24 respectively, and aberration characteristics thereof are visualized in FIG. 37 and FIG. 38 respectively.

NUMERICAL DATA EXAMPLE 10

| $f_A = 15.5$ | | NA = 0.03 | IH = 4.00 | |
|---|---|---|---|---|
| $r_1 = 53.6735$ | | $A_1$ | | |
| | $D_1 = 13.0000$ | | $n_1 = 1.49216$ | $\nu_1 = 57.50$ |
| $r_2 = -56.1501$ | | | | |
| | $D_2 = 95.1046$ | | | |
| $r_3 = 5.5093$ | | $A_3$ | | |
| | $D_3 = 3.9463$ | | $n_2 = 1.49216$ | $\nu_2 = 57.50$ |
| $r_4 = -22.0532$ | | | | |
| | $D_4 = 0.5758$ | | | |
| $r_5 = -11.4944$ | | | | |
| | $D_5 = 1.9215$ | | $n_3 = 1.58362$ | $\nu_3 = 30.37$ |
| $r_6 = 4.7495$ | | | | |
| | $D_6 = 0.6289$ | | | |
| $r_7 = \infty$ (sperture stop) | | | | |
| | $D_7 = 0.5000$ | | | |
| $r_8 = 5.6733$ | | | | |
| | $D_8 = 3.0083$ | | $n_4 = 1.49216$ | $\nu_4 = 57.50$ |
| | $D_9 = -16.6481$ | $A_9$ | | |

$A_{1E} = -0.33207 \times 10^{-5}$    $A_{1F} = -0.84916 \times 10^{-10}$
$A_{1G} = 0.12756 \times 10^{-13}$
$A_{3E} = -0.10802 \times 10^{-3}$    $A_{3F} = -0.39451 \times 10^{-5}$
$A_{3G} = -0.70124 \times 10^{-7}$
$A_{9E} = 0.44756 \times 10^{-3}$    $A_{9F} = 0.61576 \times 10^{-4}$
$A_{9G} = -0.34118 \times 10^{-6}$ $f_1 = 58.0$    $f_2 = -197.1$    $f_3 = 9.0$
$f_{2-4} = -5.5$ $|f_A/f_3| = 1.72$    $|f_2/f_1| = 3.40$
$|f_{2-4}/f_2| = 0.03$    $|\nu_G/\nu_H| = 0.53$

NUMERICAL DATA EXAMPLE 11

| $f_A = 10.2$ | | NA = 0.04 | IH = 3.00 | |
|---|---|---|---|---|
| $r_1 = 47.9154$ | | $A_1$ | | |
| | $D_1 = 13.0000$ | | $n_1 = 1.49216$ | $\nu_1 = 57.50$ |
| $r_2 = -35.6759$ | | | | |
| | $D_2 = 55.4735$ | | | |
| $r_3 = 8.5870$ | | $A_3$ | | |
| | $D_3 = 3.9463$ | | $n_2 = 1.49216$ | $\nu_2 = 57.50$ |
| $r_4 = -87.2250$ | | | | |
| | $D_4 = 0.8570$ | | | |
| $r_5 = -13.0014$ | | | | |
| | $D_5 = 1.9215$ | | $n_3 = 1.58362$ | $\nu_3 = 30.37$ |
| $r_6 = 16.0019$ | | | | |
| | $D_6 = 0.9125$ | | | |
| $r_7 = \infty$ (sperture stop) | | | | |
| | $D_7 = 0.5000$ | | | |
| $r_8 = 7.2229$ | | | | |
| | $D_3 = 3.0083$ | | $n_4 = 1.49216$ | $\nu_4 = 57.50$ |
| $r_9 = -6.8505$ | | $A_9$ | | |

$A_{1E} = -0.88762 \times 10^{-5}$    $A_{1F} = -0.21619 \times 10^{-8}$
$A_{1G} = 0.14161 \times 10^{-11}$
$A_{3E} = 0.40043 \times 10^{-3}$    $A_{3F} = -0.27801 \times 10^{-4}$
$A_{3G} = 0.23451 \times 10^{-6}$
$A_{9E} = 0.77651 \times 10^{-3}$    $A_{9F} = 0.83408 \times 10^{-4}$
$A_{9G} = -0.15460 \times 10^{-5}$ $f_1 = 43.8$    $f_2 = -700.5$    $f_3 = 7.7$
$f_{2-4} = 12.0$ $|f_A/f_3| = 1.32$    $|f_2/f_1| = 15.99$
$|f_{2-4}/f_2| = 0.02$    $|\nu_G/\nu_H| = 0.53$

EMBODIMENT 7

FIG. 11 shows the Embodiment 7 of the present invention. This embodiment has a composition wherein a first positive lens element 9-1 and a second positive lens element 9-2 are arranged in place of the single positive element composing the third lens component 9 in the Embodiment 2 shown in FIG. 6. In the Embodiment 2 illustrated in FIG. 6, a very heavy burdent is imposed on the third lens component 9 when the retrofocus degree is enhanced for the lens system composed of the second lens component 6 and the third lens component 9. The composition selected for the Embodiment 7 makes it possible to distrubute the power burden imposed on the third lens component 9 between the first positive lens element 9-1 and the second positive lens element 9-2, and bring the principal point of the focus detecting optical system as a whole closer to the second image surface 10, thereby facilitating to composed a focus detecting optical system having a higher contracting magnification without prolonging the total length thereof. Further, this composition enhances design flexibility for correcting aberrations after the production of parallax, thereby making it possible to correct aberrations more effectively.

In addition, it is desirable to design the Embodiment 7 so as to satisfy the above-mentioned conditions (3) and (4) for the reason described with reference to the Embodiment 2, and further satisfy the following conditions (16) and (17):

$$0.05 \leq |f_3/f_{3-1}| \leq 3 \qquad (16)$$

$$0.3 \leq |\nu_B/\nu_1| \leq 0.9 \qquad (17)$$

wherein the reference symbol $f_{3-1}$ represents the focal length of the first positive lens element 9-1, and the reference symbol $\nu_1$ designates the Abbe's number of either one of the two positive lens elements 9-1 and 9-2 arranged in the third lens component 9.

If the first positive lens element 9-1 has so weak a power that the lower limit of the condition (16) is exceeded, the second positive lens element 9-2 will have too strong a power or the powers will be unbalanced between these two positive lens elements, whereby aberrations will be corrected insufficiently after the production of parallax. If the first positive lens element 9-1 has so strong a power that the upper limit of the condition (16) is exceeded, in contrast, the powers will be unbalanced between the two positive lens elements as in the case where the lower limit of the condition (16) is exceeded, whereby aberrations will be corrected insufficiently after the production of parallax. If the upper or lower limit of the condition (17) is exceeded, there will undesirably result in the invonvenience similar to that described with reference to the condition (8).

Figure 25:
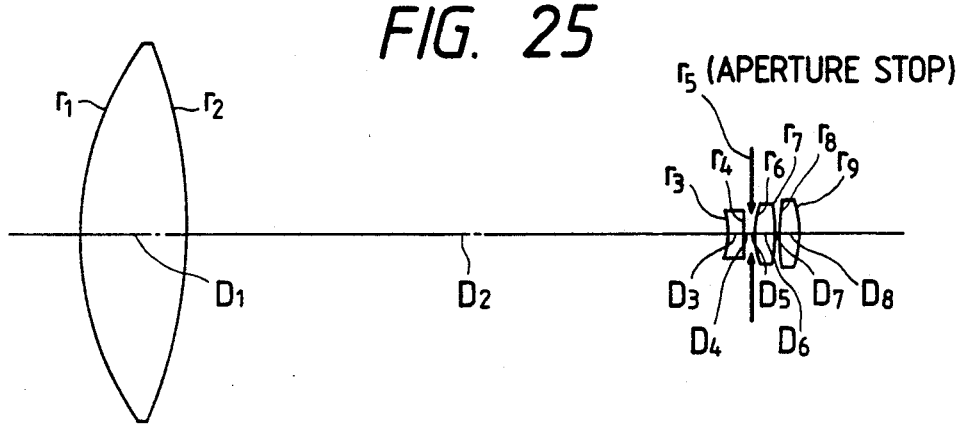
FIG. 25 is a sectional view illustrating a concrete lens arrangement in the Embodiment 7 shown in FIG. 11.
Figure 39:
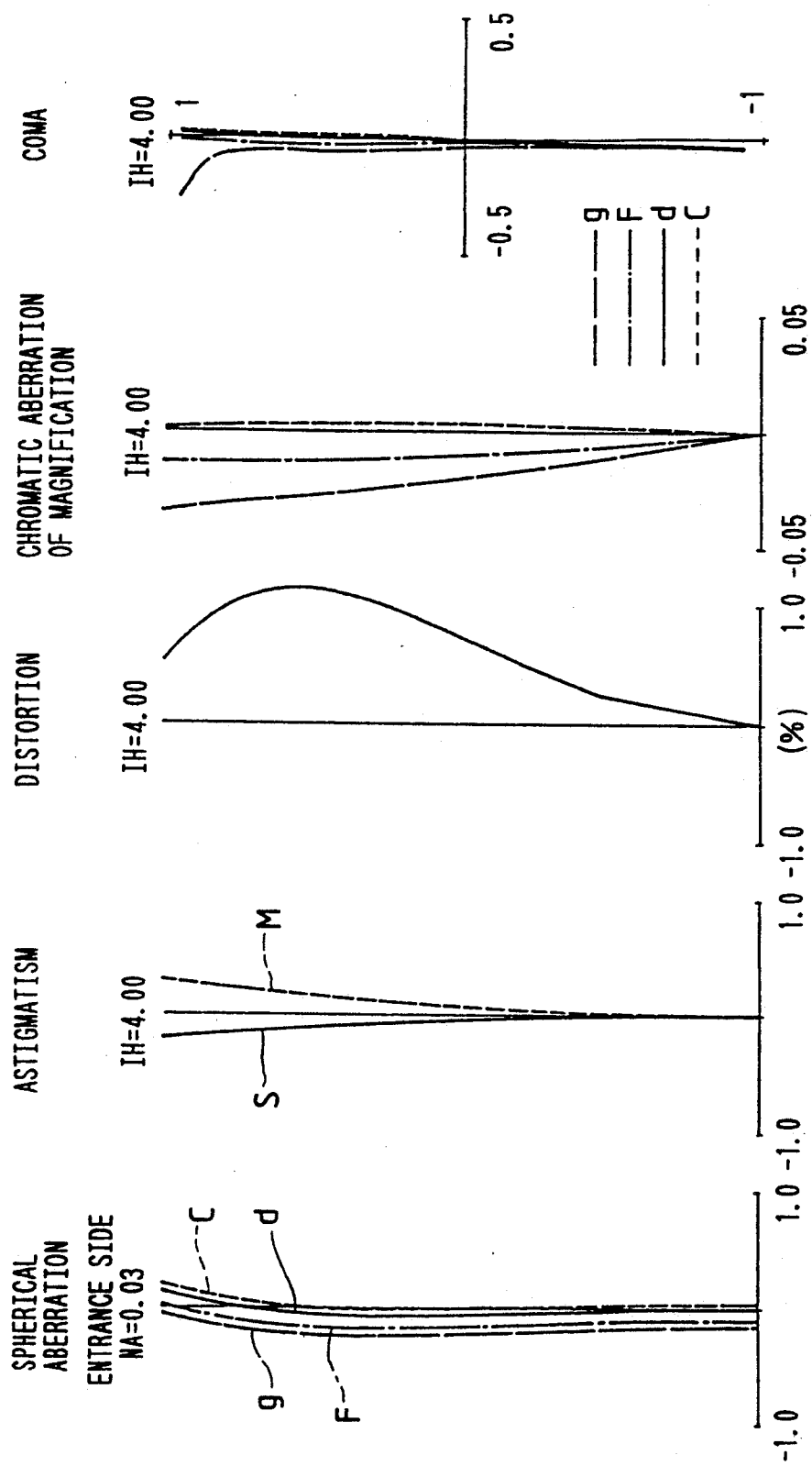

A concrete composition of the Embodiment 7 will be described as the following numerical data example 12. The composition and aberration characteristics corresponding to the numerical data example 12 are illustrated in FIG. 25 and FIG. 39 respectively.

NUMERICAL DATA EXAMPLE 12

| $f_A = 11.8$ | NA = 0.03 | IH = 4.00 | |
|---|---|---|---|
| $r_1 = 33.0431$ | $D_1 = 13.0000$ | $A_1$ $n_1 = 1.49216$ | $\nu_1 = 57.50$ |
| $r_2 = -60.8069$ | $D_2 = 64.8300$ | | |

-continued

| $f_A = 11.8$ NA = 0.03 IH = 4.00 | | |
|---|---|---|
| $r_3 = -7.2438$ | $D_3 = 2.0000$ | $n_2 = 1.58362$  $\nu_2 = 30.37$ |
| $r_4 = 372.2087$ | $D_4 = 0.5778$ | $A_4$ |
| $r_5 = \infty$ | $D_5 = 0.5000$ | |
| (sperture stop) | | |
| $r_6 = 8.4026$ | $D_6 = 2.5000$ | $n_3 = 1.49216$  $\nu_3 = 57.50$ |
| $r_7 = -36.1299$ | $D_7 = 0.5000$ | |
| $r_8 = 29.8291$ | $D_8 = 2.5000$ | $n_4 = 1.49216$  $\nu_4 = 57.50$ |
| $r_9 = -9.4204$ | | $A_9$ |

| $P_1 = 1.0000$ | $A_{1E} = -0.66597 \times 10^{-5}$ |
|---|---|
| $A_{1F} = -0.17240 \times 10^{-8}$ | $A_{1G} = -0.18632 \times 10^{-11}$ |
| $P_4 = 481.9310$ | $A_{4E} = 0.24847 \times 10^{-3}$ |
| $A_{4F} = 0.53352 \times 10^{-5}$ | $A_{4G} = -0.36620 \times 10^{-6}$ |
| $P_9 = -0.7293$ | $A_{9E} = 0.41072 \times 10^{-3}$ |
| $A_{9F} = 0.14652 \times 10^{-4}$ | $A_{9G} = 0.12958 \times 10^{-6}$ |

| $f_1 = 45.6$ | $f_2 = -12.2$ | $f_3 = 8.1$ |
|---|---|---|
| $f_{3-1} = 14.1$ | | |

| $|f_A/f_3| = 1.46$ | $|f_2/f_1| = 0.27$ |
|---|---|
| $|f_3/f_{3-1}| = 0.57$ | $|\nu_8/\nu_1| = 0.53$ |

EMBODIMENT 8

FIG. 12 illustrates the Embodiment 8 of the present invention. The Embodiment 8 has a composition wherein a negative lens element 9-3 and a positive lens element 9-4 are arranged in place of the single positive lens element composing the third lens component 9 in the Embodiment 1 shown in FIG. 5. Since the third lens component 9 can be designed as the rotrofocus type in this composition, the Embodiment 8 permits arranging the third lens component 9 at a location closer to the deflection prism 13 without displacing the principal point of the third lens component 9 from the location thereof in the Embodiment 1, thereby making it possible to correct spherical aberration and coma effectively. Further, it is desirable to design the Embodiment 8 so as to satisfy the above-mentioned conditions (1) and (2) for the reason described with reference to the Embodiment 1, and further satisfy the following conditions (18) and (19):

$$0.01 \leq |f_3/f_{3-2}| \leq 4 \quad (18)$$

$$0.3 \leq |\nu_J/\nu_K| \leq 0.9 \quad (19)$$

wherein the reference symbol $f_{3-2}$ represents the focal length of the positive lens element 9-4, and the reference symbols $\nu_K$ and $\nu_J$ designate the Abbe's numbers of the positive lens element 9-4 and the negative lens element 9-3 respectively.

If the positive lens element 9-4 has so weak a power that the lower limit of the condition (18) is exceeded, the second lens component 6 will have a strong, positive power in the secondary imaging optical system 11 or the powers will be unbalanced between the secondary imaging optical system 11 and the pupil transmitting optical system 8, thereby aggravating aberrations. If the positive lens element 9-4 has so strong a power that the upper limit of the condition (18) is exceeded, in contrast, the negative lens element 9-3 will also has a strong power, whereby the third lens component 9 will have a lowered capability to correct aberrations after the production of parallax. If the upper or lower limit of the condition (19) is exceeded, there will undesirably result in the inconvenience similar to that described with reference to the condition (8).

Figure 26:
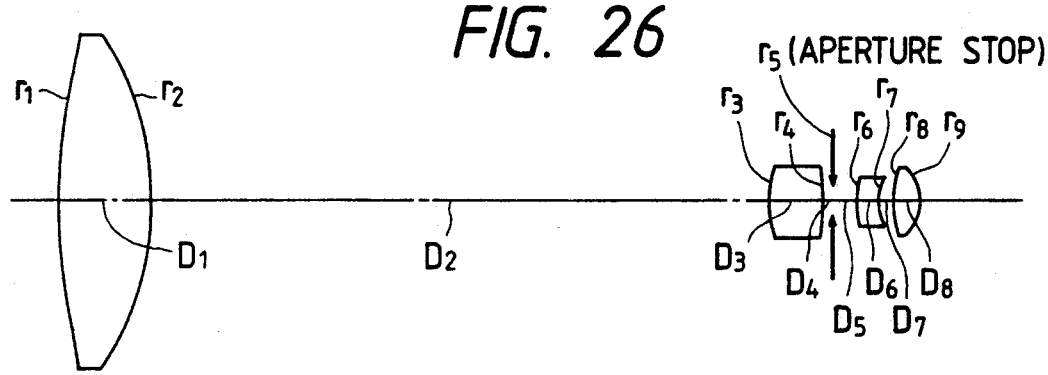
FIG. 26 is a sectional view illustrating a concrete lens arrangement in the Embodiment 8 shown in FIG. 12.
Figure 40:
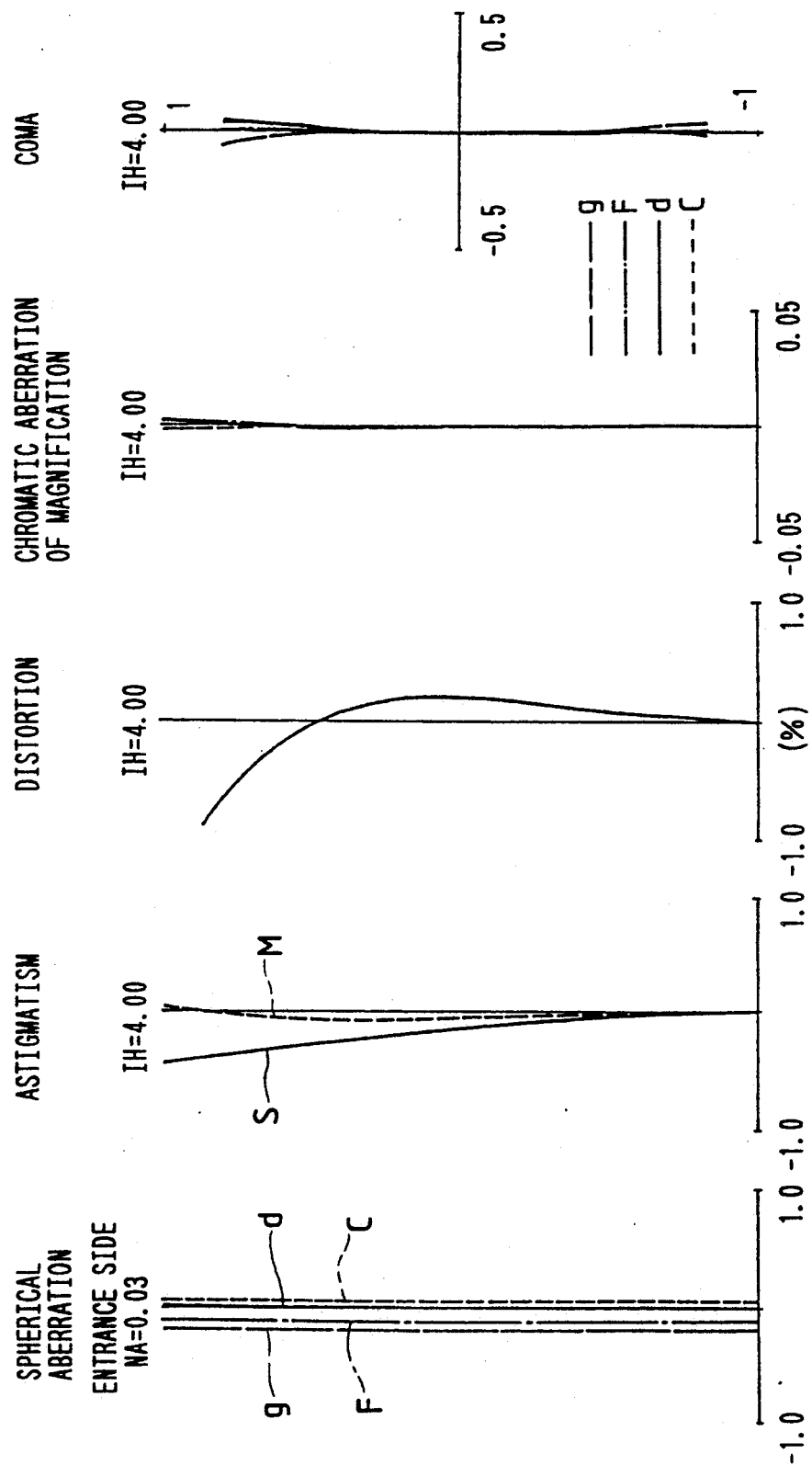

A concrete composition of the Embodiment 8 will be described below as a numerical data example 13. The composition and aberration characteristics corresponding to the numerical data example 13 are illustrated in FIG. 26 and FIG. 40 respectively.

NUMERICAL DATA EXAMPLE 13

| $f_A = 15.8$ NA = 0.03 IH = 4.00 | | | |
|---|---|---|---|
| $r_1 = 65.0753$ | $D_1 = 13.0000$ | $A_1$ | $\nu_1 = 57.50$ |
| | | $n_1 = 1.49216$ | |
| $r_2 = -42.9409$ | $D_2 = 84.9206$ | | |
| $r_3 = 14.1409$ | $D_3 = 7.5390$ | $n_2 = 1.49216$ | $\nu_2 = 57.50$ |
| $r_4 = -20.7225$ | $D_4 = 1.4946$ | $A_4$ | |
| $r_5 = \infty$ | $D_5 = 3.1453$ | | |
| (sperture stop) | | | |
| $r_6 = 17.3478$ | $D_6 = 2.8086$ | $n_3 = 1.58362$ | $\nu_3 = 30.37$ |
| $r_7 = 5.3876$ | $D_7 = 1.9352$ | $A_7$ | |
| $r_8 = 12.0409$ | $D_8 = 3.6600$ | $A_8$ | $\nu_4 = 57.50$ |
| | | $n_4 = 1.49216$ | |
| $r_9 = -6.6690$ | | | |

| $A_{1E} = -0.44737 \times 10^{-5}$ | $A_{1F} = -0.27784 \times 10^{-9}$ |
|---|---|
| $A_{1G} = 0.22573 \times 10^{-12}$ | |
| $A_{4E} = 0.26361 \times 10^{-3}$ | $A_{4F} = 0.52482 \times 10^{-5}$ |
| $A_{4G} = -0.31751 \times 10^{-6}$ | |
| $A_{7E} = -0.81082 \times 10^{-4}$ | $A_{7F} = -0.10577 \times 10^{-4}$ |
| $A_{7G} = -0.11997 \times 10^{-5}$ | |
| $A_{8E} = -0.26597 \times 10^{-3}$ | $A_{8F} = 0.37815 \times 10^{-5}$ |
| $A_{8G} = -0.56446 \times 10^{-7}$ | |

| $f_1 = 54.7$ | $f_2 = 18.4$ | $f_3 = 16.9$ |
|---|---|---|
| $f_{3-2} = 9.3$ | | |

| $|f_A/f_3| = 0.93$ | $|f_2/f_1| = 0.34$ |
|---|---|
| $|f_3/f_{3-2}| = 1.82$ | $|\nu_J/\nu_K| = 0.53$ |

EMBODIMENT 9

FIG. 13 illustrates the Embodiment 9 of the present invention. This embodiment has a composition wherein a positive lens element 9-5 and a negative lens element 9-6 are arranged in place of the single positive lens element composing the third lens component 9 in the Embodiment 1 shown in FIG. 5. Since the third lens component 9 can be designed as the telephoto type in this composition, the Embodiment 9 permits arranging the third lens component 9 at a locations closer to the secondary image surface 10 without displacing the principal point of the third lens component 9 from the location thereof in the Embodiment 1, thereby making it possible to correct astigmatism and distortion effectively. Further, it is desirable to design the Embodiment 9 so as to satisfy the above-mentioned conditions (1) and (2) for the reason described with reference to the Embodiment 1, and further satisfy the following conditions (20) and (21):

$$0.01 \leq |f_3/f_{3-3}| \leq 4 \quad (20)$$

$$0.3 \leq |\nu_L/\nu_M| \leq 0.9 \quad (21)$$

wherein the reference symbol $f_{3-3}$ represents the focal length of the positive lens element 9-5, and the reference symbols $\nu_L$ and $\nu_M$ designate the Abbe's numbers of the positive lens element 9-5 and the negative lens element 9-6 respectively.

If the positive lens element 9-5 arranged in the third lens component 9 has so weak a power that the lower limit of the condition (20) is exceeded, the second lens component 6 will have a strong positive power in the secondary imaging optical system 11, or the powers will be unbalanced between the secondary imaging optical system 11 and the pupil transmitting optical system 8, thereby aggravating aberrations. If the positive lens element 9-5 has so strong a power that the upper limit of the condition (20) is exceeded, in contrast, the negative lens element 9-6 will also has a strong power, thereby aggravating aberrations in the third lens component 9 after the production of parallax. If the upper or lower limit of the condition (21) is exceeded, there will undesirably result in the inconvenience similar to that described with reference to the condition (8).

Figure 27:
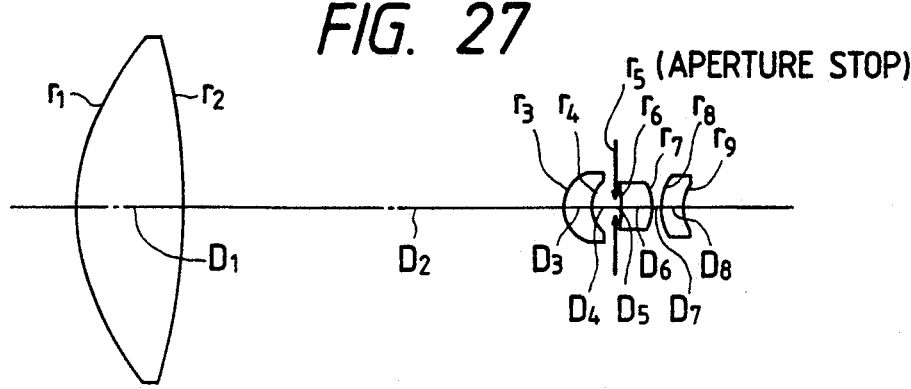
FIG. 27 is a sectional view illustrating a concrete lens arrangement in the Embodiment 9 shown in FIG. 13.
Figure 41:
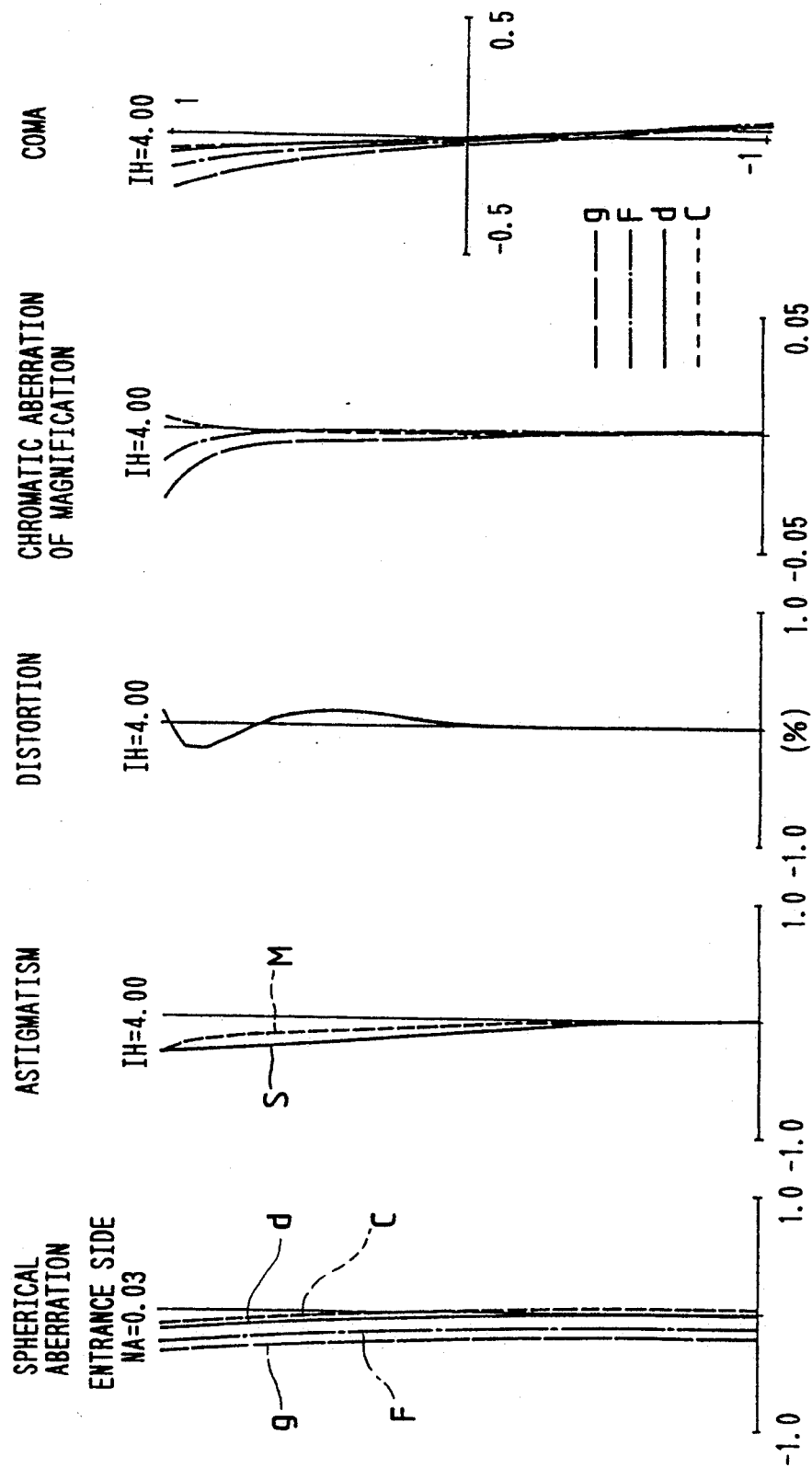

A concrete composition of the Embodiment 9 will be described below in the form of the following numerical data example 14. The composition and aberration characteristics corresponding to the numerical data example 14 are illustrated in FIG. 27 and FIG. 41 respectively.

NUMERICAL DATA EXAMPLE 14

| $f_A = 10.1$ | $NA = 0.03$ | $IH = 4.00$ | |
|---|---|---|---|
| $r_1 = 28.2437$ | $D_1 = 15.0000$ | $A_1$ $n_1 = 1.49216$ | $v_1 = 57.50$ |

$$f_{3-3} = 12.6$$

| $|f_A/f_3| = 0.94$ | $|f_2/f_1| = 0.45$ |
|---|---|
| $|f_3/f_{3-3}| = 0.85$ | $|v_L/v_M| = 0.53$ |

In the numerical data example listed above, the reference symbols $A_1$, $A_2$, $A_3$, $A_4$, $A_5$, $A_6$, $A_7$, $A_8$ and $A_9$ represent that the surfaces $r_1$, $r_2$, $r_3$, $r_4$, $r_5$, $r_6$, $r_7$, $r_8$ and $r_9$ are aspherical surfaces respectively, and the reference symbols $A_{iE}$ (i=1, 2, 3, 4, 5, 6, 7, 8, 9), $A_{iF}$ (i=1, 2, 3, 4, 5, 6, 7, 8, 9) and $A_{iG}$ (i=1, 2, 3, 4, 5, 6, 7, 8, 9) designate the aspherical surface coefficients of the fourth order, sixth order and eighth order respectively. When the optical axis is taken as the X axis, and the direction passing through the vertex of an aspherical surface of interest and perpendicular to the optical axis is taken as the Y axis, the aspherical surface is expressed by the following formula:

$$X = \frac{Y^2/R_A}{1 + \sqrt{1 - P(Y/R_A)^2}} + A_{iE}Y^4 + A_{iF}Y^6 + A_{iG}Y^8 + \ldots$$
$$(i = 1, 3, 4, 5, 6, 7, 8, 9)$$

wherein the reference symbol $R_A$ represent the paraxial radius of curvature of the aspherical surface of interest and the reference symbol P designates the conical coefficient. Further, in the embodiments described above, the reference symbol NA represents numerical aperture on the side of incidence, the reference symbol IH designates image height, the reference symbol $r_i$ denotes radius of curvature on the i'th lens surface, the reference symbol $D_I$ represents distance as measured from the i'th lens surface to the $I+1$'th lens surface, the reference symbol $n_i$ designates refractive index for the d line (587.56 nm) of the medium of the i'th lens element as counted from the object side and the reference symbol $v_i$ denotes the Abbe's number of the medium of the i'th lens element as counted from the object side.

| $r_2 = -86.0274$ | | | |
|---|---|---|---|
| | $D_2 = 52.2664$ | | |
| $r_3 = 5.0040$ | | | |
| | $D_3 = 4.0000$ | $n_2 = 1.49216$ | $v_2 = 57.50$ |
| $r_4 = 7.3964$ | | $A_4$ | |
| | $D_4 = 3.2539$ | | |
| $r_5 = \infty$ (aperture stop) | | | |
| | $D_5 = 0.5436$ | | |
| $r_6 = 27.3740$ | | | |
| | $D_6 = 4.5702$ | $n_3 = 1.49216$ | $v_3 = 57.50$ |
| $r_7 = -7.5433$ | | $A_7$ | |
| | $D_7 = 1.1307$ | | |

-continued

| $r_8 = 7.2620$ | | | |
|---|---|---|---|
| | $D_8 = 3.1653$ | $n_4 = 1.58362$ | $v_4 = 30.37$ |
| $r_9 = 5.9716$ | | | |
| $A_{1E} = -0.76788 \times 10^{-5}$ | | $A_{1F} = -0.77326 \times 10^{-9}$ | |
| $A_{1G} = -0.10865 \times 10^{-10}$ | | | |
| $A_{4E} = 0.23693 \times 10^{-2}$ | | $A_{4F} = -0.12557 \times 10^{-3}$ | |
| $A_{4G} = 0.23166 \times 10^{-4}$ | | | |
| $A_{7E} = -0.18238 \times 10^{-2}$ | | $A_{7F} = 0.24238 \times 10^{-3}$ | |
| $A_{7G} = -0.13133 \times 10^{-4}$ | | | |
| $f_1 = 45.2$ | $f_2 = 20.3$ | $f_3 = 10.7$ | |

For paraxial power distribution in the composition of the Embodiment 1 illustrated in FIG. 5, various lens arrangements can be considered as exemplified below in addition to the numerical data described above. In the numerical data listed below, the reference symbol f' represents the focal length of the focus detecting optical system 14, the reference symbol $\beta_1$ designates the magnification of the secondary imaging optical system 11 and the reference symbol $\beta_2$ denotes the magnification of the pupil transmitting optical system 8.

LENS ARRANGEMENT EXAMPLE 1

| $f' = 11.23$ | $f_1 = 31.01$ | $f_2 = 40.00$ |
|---|---|---|
| $f_3 = 9.76$ | $\beta_1 = -0.18$ | $\beta_2 = -0.87$ |
| $d_1 = 60.00$ | $d_2 = 55.00$ | $d_3 = 15.00$ |
| $l_1 = 7.47$ | $l_2 = 24.09$ | $l_3 = 79.09$ |
| $|f_A/f_3| = 1.20$ | | $|f_2/f_1| = 4.10$ |

LENS ARRANGEMENT EXAMPLE 2

| $f' = 14.49$ | $f_1 = 31.61$ | $f_2 = 20.00$ |
|---|---|---|
| $f_3 = 13.15$ | $\beta_1 = -0.26$ | $\beta_2 = -0.70$ |
| $d_1 = 60.00$ | $d_2 = 55.00$ | $d_3 = 15.00$ |
| $l_1 = 7.23$ | $l_2 = 22.30$ | $l_3 = 77.30$ |
| $|f_A/f_3| = 1.10$ | | $|f_2/f_1| = 1.50$ |

LENS ARRANGEMENT EXAMPLE 3

| $f' = 9.23$ | $f_1 = 28.99$ | $f_2 = 40.00$ |
|---|---|---|
| $f_3 = 10.50$ | $\beta_1 = -0.18$ | $\beta_2 = -0.91$ |
| $d_1 = 60.00$ | $d_2 = 55.00$ | $d_3 = 15.00$ |
| $l_1 = 1.07$ | $l_2 = 14.78$ | $l_3 = 69.78$ |
| $|f_A/f_3| = 0.90$ | | $|f_2/f_1| = 3.80$ |

LENS ARRANGEMENT EXAMPLE 4

| $f' = 15.00$ | $f_1 = 32.18$ | $f_2 = 15.00$ |
|---|---|---|
| $f_3 = 5.42$ | $\beta_1 = -0.18$ | $\beta_2 = -0.59$ |
| $d_1 = 60.00$ | $d_2 = 55.00$ | $d_3 = 15.00$ |
| $l_1 = 7.35$ | $l_2 = 70.30$ | $l_3 = 77.65$ |
| $|f_A/f_3| = 2.80$ | | $|f_2/f_1| = 2.80$ |

All of the lens arrangement examples 1 through 4 listed above provide the effects which are similar to those available with the Embodiment 1.

It is needless to say that the present invention is not limited to the compositions described as the Embodiments 1 through 9 described above. For example, it is possible to obtain a wider field angle, though the power of the first lens component 5 is slightly strengthened, by composing the first lens component 5 of a plurality of lens elements which have a positive total power.

The present invention makes it possible to obtain a focus detecting optical system which has a wide focus detecting field angle and a high imaging magnification. Further, the present invention enhances design flexibility for the focus detecting optical system, thereby making it possible to shorten the total length, improve the function to correct aberrations and enhance focus detecting accuracy thereof.

What is claimed is:

1. A focus detecting device comprising:
   a primary imaging optical system for forming a primary image of an object;
   a focus detecting optical system consisting of a first lens component, a second lens component and a third lens component all having positive refractive powers, and serving as a pupil transmitting optical system for forming an image of the exit pupil of said primary imaging optical system and also as a secondary imaging optical system for forming a secondary image of said primary image;
   an aperture stop arranged on the image surface of said exit pupil and having at least two apertures at locations offset from the optical axis;
   two deflection prisms for forming two images arranged in the vicinity of said aperture stop at locations corresponding to said apertures; and
   a photoelectric transducing member arranged on the secondary image surface and functioning to detect variation of the relative positions of the two images formed by said focus detecting optical system and said deflection prisms,
   said primary optical system, focus detecting optical system, aperture stop, deflection prisms and photoelectric transducing member being arranged on an optical axis in the order from the object side.

2. A focus detecting device according to claim 1 satisfying the following conditions (1) and (2):
   (1) $0.02 \leq |f_A/f_3| \leq 4$
   (2) $0.03 \leq |f_2/f_1| \leq 5$
   wherein the reference symbol $f_1$ represents focal length of said first lens component, the reference symbol $f_2$ represents focal length of said second lens component, the reference symbol $f_3$ denotes focal length of said third lens component and the reference symbol $f_A$ represents focal length of said second imaging optical system.

3. A focus detecting device according to claim 1 satisfying the following conditions (3) through (5):
   (3) $0.05 \leq |f_A/f_3| \leq 4$
   (4) $0.05 \leq |f_2/f_1| \leq 30$
   (5) $0.3 \leq |\nu_B/\nu_C| \leq 0.9$
   wherein the reference symbol $f_1$ represents focal length of said first lens component, the reference symbol $f_2$ represents focal length of said second lens component, the reference symbol $f_3$ represents focal length of said third lens component, the reference symbol $f_A$ represents focal length of said second imaging optical system, the reference symbol $\nu_B$ represents Abbe's number of said second lens component and the reference symbol $\nu_C$ represents Abbe's number of said third lens component.

4. A focus detecting device according to claim 1 satisfying the following conditions (6) through (8):
   (6) $0.05 \leq |f_2/f_1| \leq 10$
   (7) $0.05 \leq |f_A/f_2| \leq 4$
   (8) $0.3 \leq |\nu_C/\nu_B| \leq 0.9$
   wherein the reference symbol $f_1$ represents focal length of said first lens component, the reference symbol $f_2$ represents focal length of said second lens component, the reference symbol $f_A$ represents focal length of said second imaging optical system, the reference symbol $\nu_B$ represents Abbe's number of said second lens component and the reference symbol $\nu_C$ represents Abbe's number of said third lens component.

5. A focus detecting device according to claim 1, wherein said second lens component comprises two positive lens elements and said focus detecting device satisfies the following conditions (6), (7), (9) and (10):
   (6) $0.05 \leq |f_2/f_1| \leq 10$
   (7) $0.05 \leq |f_A/f_2| \leq 4$
   (9) $0.05 \leq |f_{2-1}/f_2| \leq 30$
   (10) $0.3 \leq |\nu_C/\nu_D| \leq 0.9$
   wherein the reference symbol $f_1$ represents focal length of said first lens component, the reference symbol $f_2$ represents focal length of said second lens component, the reference symbol $f_{2-1}$ represents focal length of said positive lens arranged on the object side of said second lens component, the reference symbol $f_A$ represents focal length of said second imaging optical system, the reference symbol $\nu_C$ represents Abbe's number of said third lens component and the reference symbol $\nu_D$ represents Abbe's number of one of said two positive lens elements of said second lens component.

6. A focus detecting device according to claim 2, wherein said second lens component comprises a negative lens element arranged on the object side and a positive lens element arranged on the image side and said focus detecting device further satisfies the following conditions (11) and (12):
   (11) $0.01 \leq |f_{2-2}/f_2| \leq 4$
   (12) $0.3 \leq |\nu_E/\nu_F| \leq 0.9$
   wherein the reference symbol $f_2$ represents focal length of said second lens component, the reference symbol $f_{2-2}$ represents focal length of said positive lens element of said second lens component, the reference symbol $\nu_E$ represents Abbe's number of said negative lens element of said second lens component and the reference symbol $\nu_F$ represents Abbe's number of said positive lens element of said second lens component.

7. A focus detecting device according to claim 2, wherein said second lens component comprises a positive lens element arranged on the object side and a negative lens element arranged on the image side and has a positive composite power and said focus detecting device further satisfies the following conditions (13) and (14):
   (13) $0.05 \leq |f_{2-3}/f_2| \leq 3$
   (14) $0.3 \leq |\nu_G/\nu_H| \leq 0.9$
   wherein the reference symbol $f_2$ represents focal length of said second lens component, the reference symbol $f_{2-3}$ represents focal length of said positive lens element of said second lens component, the reference symbol $\nu_G$ represents Abbe's number of said positive lens element of said second lens component and the reference symbol $\nu_H$ represents Abbe's number of said negative lens element of said second lens component.

8. A focus detecting device according to claim 1, wherein said second lens component comprises a positive lens element arranged on the object side and a negative lens element arranged on the image side and has a negative composite power and said focus detecting device satisfies the following conditions (3), (4), (14) and (15):
   (3) $0.05 \leq |f_A/f_3| \leq 4$ (4) $0.05 \leq |f_2/f_1| \leq 30$
(14) $0.3 \leq |\nu_G/\nu_H| \leq 0.9$
(15) $0.01 \leq |f_{2-4}/f_4| \leq 4$ wherein the reference symbol $f_1$ represents focal length of said first lens component, the reference symbol $f_2$ represents focal length of said second lens component, the reference symbol $f_3$ represents focal length of said third lens component, the reference symbol $f_4$ represents focal length of said second imaging optical system, the reference symbol $f_{2-4}$ represents focal length of said negative lens element of said second lens component, the reference symbol $\nu_G$ represents Abbe's number of said positive lens elements of said second lens element, the reference symbol $\nu_H$ represents Abbe's number of said negative lens element of said second lens component.

9. A focus detecting device according to claim 1, wherein said third lens component comprises a first positive lens element and a second positive lens element and said focus detecting device satisfies the following conditions (3), (4), (16) and (17):

(3) $0.05 \leq |f_4/f_3| \leq 4$
(4) $0.05 \leq |f_2/f_1| \leq 30$
(16) $0.05 \leq |f_3/f_{3-1}| \leq 3$
(17) $0.3 \leq |\nu_B/\nu_1| \leq 0.9$ wherein the reference symbol $f_1$ represents focal length of said first lens component, the reference symbol $f_2$ represents focal length of said second lens component, the reference symbol $f_3$ represents focal length of said third lens component, the reference symbol $f_{3-1}$ represents focal length of said first positive lens element of said third lens component, the reference symbol $f_4$ represents focal length of said second imaging optical system, the reference symbol $\nu_B$ represent Abbe's number of said second lens component and the reference symbol $\nu_1$ represents Abbe's number of one of said first and second positive lens elements.

10. A focus detecting device according to claim 2 said third lens component comprises a negative lens element arranged on the object side and a positive lens element arranged on the image side and said focus detecting device further satisfies the following conditions (18) and (19):

(18) $0.01 \leq |f_3/f_{3-2}| \leq 4$
(19) $0.3 \leq |\nu_J/\nu_K| \leq 0.9$ wherein the reference symbol $f_3$ represents focal length of said third lens component, the reference symbol $f_{3-2}$ represents focal length of said positive lens element of said third lens component, the reference symbol $\nu_J$ represents Abbe's number of said positive lens element of said third lens component and the reference symbol $\nu_K$ represents Abbe's number of said negative lens element of said third lens component.

11. A focus detecting device according to claim 2, wherein said third lens component comprises a positive lens element arranged on the object side and negative lens element arranged on the image side and said focus detecting device further satisfies the following conditions (20) and (21):

(20) $0.01 \leq |f_3/f_{3-3}| \leq 4$
(21) $0.3 \leq |\nu_L/\nu_M| \leq 0.9$ wherein the reference symbol $f_3$ represents focal length of said third lens component, the reference symbol $f_{3-3}$ represents focal length of said positive lens element of said third lens component, the reference symbol $\nu_L$ represents Abbe's number of said positive lens element of said third lens component and the reference symbol $\nu_M$ represents Abbe's number of said negative lens element of said third lens component.

* * * * *